(12) United States Patent
Takiguchi et al.

(10) Patent No.: US 9,061,630 B2
(45) Date of Patent: Jun. 23, 2015

(54) VEHICLE TRAVEL CONTROL DEVICE

(75) Inventors: Hirotaka Takiguchi, Utsunomiya (JP);
Go Suzaki, Utsunomiya (JP); Yoichi Sugimoto, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 13/823,795

(22) PCT Filed: Aug. 12, 2011

(86) PCT No.: PCT/JP2011/068461
§ 371 (c)(1),
(2), (4) Date: Mar. 15, 2013

(87) PCT Pub. No.: WO2012/039212
PCT Pub. Date: Mar. 29, 2012

(65) Prior Publication Data
US 2013/0173113 A1    Jul. 4, 2013

(30) Foreign Application Priority Data

Sep. 21, 2010 (JP) .................................. 2010-211226
Oct. 14, 2010 (JP) .................................. 2010-231376

(51) Int. Cl.
*B60Q 9/00* (2006.01)
*B60T 7/22* (2006.01)
(Continued)

(52) U.S. Cl.
CPC ............... *B60Q 9/008* (2013.01); *B60W 10/06* (2013.01); *B60W 10/184* (2013.01); *B60W 30/143* (2013.01); *B60W 30/18145* (2013.01); *B60W 50/087* (2013.01); *B60K 26/021* (2013.01); *B60T 7/22* (2013.01); *B60W 50/14* (2013.01);
(Continued)

(58) Field of Classification Search
CPC .......................... B60Q 9/00; B60W 2540/10
USPC ............. 701/36, 70, 80, 93, 96; 340/436, 903
See application file for complete search history.

(56) References Cited

U.S. PATENT DOCUMENTS 7,162,353 B2 * 1/2007 Minowa et al. ................. 701/96
2002/0010537 A1 * 1/2002 Yamaguchi et al. ............ 701/80

(Continued)

FOREIGN PATENT DOCUMENTS

JP    04-236699    8/1992
JP    07-069101    3/1995

(Continued)

*Primary Examiner* — Thomas G Black
*Assistant Examiner* — Wae Louie
(74) *Attorney, Agent, or Firm* — Rankin, Hill & Clark LLP

(57) ABSTRACT

A vehicle travel control device can accurately determine a driver's intention to adjust the vehicle speed. After applying attention attracting reaction force corresponding to outside circumstances and the like to an accelerator pedal through a reaction force application mechanism, a reaction force control unit outputs intention determining reaction force that is used to determine the driver's intention to adjust the vehicle speed and is smaller than the attention attracting reaction force, and determines the intention to adjust the vehicle speed on the basis of the accelerator pedal operation amount of the driver while the intention determining reaction force is being applied to the accelerator pedal through the reaction force application mechanism.

9 Claims, 21 Drawing Sheets

(51) Int. Cl.
  *B60W 10/06* (2006.01)
  *B60W 10/184* (2012.01)
  *B60W 30/18* (2012.01)
  *B60W 50/08* (2012.01)
  *B60K 26/02* (2006.01)
  *B60W 50/14* (2012.01)
  *B60W 50/16* (2012.01)
  *B60W 50/10* (2012.01)
  *B60W 30/14* (2006.01)

(52) U.S. Cl.
  CPC ........ *B60W2520/10* (2013.01); *B60W 2540/10* (2013.01); *B60W 2550/146* (2013.01); *B60W 50/16* (2013.01); *B60K 26/02* (2013.01); *B60K 2026/023* (2013.01); *B60W 2540/106* (2013.01); *B60W 50/10* (2013.01)
  USPC .................. 701/36; 701/70; 701/80; 701/93; 701/96; 340/436; 340/903

(56) References Cited

U.S. PATENT DOCUMENTS

| | | | |
|---|---|---|---|
| 2003/0158647 A1* | 8/2003 | Katakura et al. | 701/70 |
| 2005/0110348 A1* | 5/2005 | Hijikata et al. | 307/10.1 |
| 2005/0171675 A1* | 8/2005 | Sawamoto et al. | 701/96 |
| 2007/0012499 A1* | 1/2007 | Kobayashi et al. | 180/206 |
| 2007/0106448 A1* | 5/2007 | Minowa et al. | 701/96 |
| 2007/0272464 A1* | 11/2007 | Takae et al. | 180/169 |
| 2010/0082212 A1* | 4/2010 | Miyajima et al. | 701/70 |
| 2010/0082215 A1* | 4/2010 | Miyajima et al. | 701/93 |
| 2012/0078468 A1* | 3/2012 | Popp et al. | 701/36 |
| 2012/0078496 A1* | 3/2012 | Lindhuber et al. | 701/123 |
| 2013/0166101 A1* | 6/2013 | Noumura et al. | 701/1 |
| 2013/0173113 A1* | 7/2013 | Takiguchi et al. | 701/36 |

FOREIGN PATENT DOCUMENTS

| | | |
|---|---|---|
| JP | 2001-287518 | 10/2001 |
| JP | 2003-025870 | 1/2003 |
| JP | 2003-237421 | 8/2003 |
| JP | 2004-299427 | 10/2004 |
| JP | 2005-157481 | 6/2005 |
| JP | 2006-062418 | 3/2006 |
| JP | 2007-22238 | 2/2007 |
| JP | 2009-262846 | 11/2009 |
| JP | 2010-052468 | 3/2010 |
| WO | 2009/136512 | 11/2009 |

* cited by examiner

VEHICLE TRAVEL CONTROL DEVICE

TECHNICAL FIELD

The present invention relates to a vehicle travel control apparatus (device) for determining the intention of a driver to adjust the vehicle speed of a vehicle (host vehicle) based on the depression of an accelerator pedal, which is caused by the driver with respect to a reaction force applied to the accelerator pedal from the vehicle while the vehicle is traveling, and for controlling the reaction force applied to the accelerator pedal based on a recommended speed, which is established depending on an external situation around the vehicle, or depending on information representing the traveling state of the vehicle.

BACKGROUND ART

Heretofore, there has been proposed a vehicle travel control apparatus for determining the intention of a driver to adjust the vehicle speed of a vehicle based on the depression of an accelerator pedal, which is caused by the driver against a reaction force applied to the accelerator pedal. See, Japanese Laid-Open Patent Publication No. 2009-262846 (hereinafter referred to as "JP2009-262846A").

According to JP2009-262846A, if the present vehicle speed of a moving vehicle is higher than a recommended speed that is estimated by a navigation system, then the vehicle travel control apparatus increases the reaction force applied to the accelerator pedal in order to bring the vehicle speed to the recommended speed.

The vehicle travel control apparatus also determines the driver's intention to accelerate the vehicle, the driver's intention to decelerate the vehicle, the driver's intention to maintain the recommended speed, or the driver's intention to maintain the present vehicle speed, depending on the depression of the accelerator pedal, which is caused by the driver with respect to the increased reaction force.

The vehicle travel control apparatus disclosed in JP2009-262846A is able to appropriately control driving of the vehicle depending on the intention of the driver to adjust the vehicle speed.

There also is known a vehicle travel control apparatus for assisting a driver of a vehicle in driving the vehicle by applying a reaction force to the accelerator pedal with an actuator such as a motor or the like. See, Japanese Laid-Open Patent Publication No. 04-236699 (hereinafter referred to as "JP04-236699A") and Japanese Laid-Open Patent Publication No. 2007-022238 (hereinafter referred to as "JP2007-022238A").

JP04-236699A discloses a technique in which, based on information of a curved road (21) from a navigation system (22), an approaching speed is calculated depending on road characteristics such as the radius of curvature of the curved road. Further, if the actual speed of the vehicle is higher than the approaching speed, the driver is informed accordingly and the driver is instructed to reduce the vehicle speed or to automatically decelerate the vehicle (see Abstract).

According to JP2007-022238A, if while traveling straight the vehicle sees a decreasing distance to a leading vehicle (200), which is detected by a laser radar (10), the vehicle travel control apparatus automatically brakes the vehicle (see, for example, FIGS. 1, 3, 4 and 7).

SUMMARY OF INVENTION

If the navigation system in a vehicle detects a curved road ahead, or if the intervehicular distance sensor on the vehicle detects a decreasing distance to a leading vehicle while the vehicle is traveling, then according to the technique disclosed in JP2009-262846A, a recommended speed is established as an extremely low speed. Therefore, the speed difference between the present speed and the recommended speed becomes so large that the reaction force applied to the accelerator pedal increases quickly.

Such a quick increase in the applied reaction force tends to make the driver return the accelerator pedal more than intended, whereupon the driver is judged as having an intention to decelerate the vehicle. As a result, the vehicle speed is controlled in a manner that differs from the intention of the driver to adjust the vehicle speed. The driver may thus possibly feel uncomfortable concerning the vehicle speed. Consequently, such a technique is in much need of improvement.

According to JP04-236699A, as described above, an approaching speed is used. However, the approaching speed may possibly become inappropriate on account of errors that occur when the navigation system detects the present position of the vehicle, or due to inaccuracies in the map information stored in the navigation system. If the approaching speed is inappropriate, then a warning or an automatic brake may not necessarily be triggered in a manner that is suitable for the driver, thereby tending to make the driver feel ill at ease.

According to JP2007-022238A, since the accuracy of the range-finding radar may possibly vary depending on the external situation, a warning or an automatic brake may not necessarily be triggered in a manner that is suitable for the driver, thereby tending to make the driver feel ill at ease.

The above problems are liable to arise in a traveling mode (e.g., an automatic cruising mode) of the vehicle, as well as due to external situations around the vehicle.

The present invention has been made in view of the aforementioned difficulties. It is an object of the present invention to provide a vehicle travel control apparatus, which is capable of more accurately determining (identifying) the intention of the driver to adjust the vehicle speed of a vehicle, and also of preventing the driver from feeling uncomfortable concerning the manner in which the driver operates an accelerator pedal.

According to the present invention, there is provided a vehicle travel control apparatus comprising a reaction force controller for controlling a reaction force to be applied to an accelerator pedal, a depressed angle sensor for detecting an accelerator pedal depressed angle of the accelerator pedal, and an intention determiner for determining a vehicle speed adjusting intention of a driver based on the accelerator pedal depressed angle detected by the depressed angle sensor, wherein the reaction force controller outputs an intention determining reaction force, which serves as a reference for an intention determining period required to determine the vehicle speed adjusting intention, when the intention determiner determines the vehicle speed adjusting intention of the driver, and the intention determiner determines the vehicle speed adjusting intention of the driver depending on the accelerator pedal depressed angle, which is detected by the depressed angle sensor during the intention determining period.

With the above arrangement, the intention determining reaction force is applied to the accelerator pedal during the intention determining period, and the intention of the driver to adjust the vehicle speed is determined from the accelerator pedal depressed angle, which is produced by the driver during the intention determining period.

When there is a curved road in front of the host vehicle or the intervehicular distance to a leading vehicle is reduced while the host vehicle is traveling, the reaction force applied to the accelerator pedal is increased temporarily, thereby returning the accelerator pedal in order for the host vehicle to be automatically decelerated. Even in such a situation, since the intention determining period is provided in order to determine the intention of the driver based on the intention determining reaction force, returning of the accelerator pedal is prevented from being recognized in error as having been intended by the driver.

Therefore, the driver's intention to adjust the vehicle speed can be determined accurately.

The vehicle travel control apparatus further comprises a recommended speed estimator for estimating a recommended speed for a host vehicle based on an external situation around the host vehicle, or based on a traveling state of the host vehicle, and a vehicle speed sensor for detecting a present vehicle speed of the host vehicle. The reaction force controller judges whether or not it is necessary to seek the driver's attention based on the recommended speed estimated by the recommended speed estimator, the present vehicle speed detected by the vehicle speed sensor, and a present accelerator pedal depressed angle detected by the depressed angle sensor. Then, if the reaction force controller determines that it is necessary to seek the driver's attention, the reaction force controller applies an attention seeking reaction force to the accelerator pedal, and thereafter applies the intention determining reaction force, which is smaller than the attention seeking reaction force, to the accelerator pedal.

With the above arrangement, after the attention seeking reaction force has been applied to the accelerator pedal, the intention determining reaction force for determining the driver's intention, which is smaller than the attention seeking reaction force, is applied to the accelerator pedal. Therefore, since the driver can be notified of a situation in which the host vehicle needs to be decelerated, which is automatically determined by the host vehicle depending on the external situation around the host vehicle or the traveling state of the host vehicle, the intention of the driver is given priority, even if the external situation or the traveling state determined by the host vehicle is recognized in error or goes against the intention of the driver.

For example, the host vehicle produces an attention seeking reaction force depending on the curvature of a curved road based on information from a navigation system or the like, or based on the intervehicular distance to a leading vehicle detected by a radar device. In other words, the host vehicle attempts to decelerate itself based on its own judgment. However, if the information concerning the curved road from the navigation system is erroneous, or if the driver wants to accelerate the host vehicle and overtake the leading vehicle although the intervehicular distance to the leading vehicle is decreasing, then it is understood that the driver intends to accelerate the host vehicle or to maintain the vehicle speed.

The intention determining reaction force is applied after the attention seeking reaction force has been applied, and the intention of the driver is determined based on an action of the driver at the time that the intention determining reaction force is applied. Thus, the intention of the driver to adjust the vehicle speed is given priority over the assistive action and notice from the host vehicle.

The vehicle travel control apparatus further comprises a target depressed angle setter for setting a target accelerator pedal depressed angle, which is the accelerator pedal depressed angle required to maintain a target cruising speed, which is a vehicle speed when the driver holds the accelerator pedal depressed angle within a predetermined range, and an attention seeking depressed angle setter for setting an attention seeking accelerator pedal depressed angle, which is the accelerator pedal depressed angle that is set to a value smaller than the target accelerator pedal depressed angle, as a threshold value for judging whether or not the driver's attention is to be sought. If an actual accelerator pedal depressed angle detected by the depressed angle sensor is greater than the target accelerator pedal depressed angle set by the target depressed angle setter, the reaction force controller applies a cruising reaction force to the accelerator pedal for maintaining the target cruising speed, and if the present vehicle speed detected by the vehicle speed sensor is greater than the recommended speed estimated by the recommended speed estimator by at least a predetermined value, and the present accelerator pedal depressed angle is greater than the attention seeking accelerator pedal depressed angle, the reaction force controller applies the attention seeking reaction force, which is greater than the cruising reaction force.

With the above arrangement, when the host vehicle begins to travel in a constant-speed traveling mode at the target cruising speed, the host vehicle is able to judge whether or not to seek the driver's attention. Therefore, while the driver acts frequently on the accelerator pedal, the host vehicle does not seek the driver's attention. Accordingly, an attention seeking reaction force, which is not intended by the driver, is prevented from being applied frequently to the accelerator pedal.

If a maximum value of the actual accelerator pedal depressed angle in the intention determining period is smaller than the attention seeking accelerator pedal depressed angle set by the attention seeking depressed angle setter, the intention determiner determines that the driver intends to decelerate the host vehicle.

With the above arrangement, the intention of the driver to decelerate the host vehicle can be determined accurately.

The vehicle travel control apparatus further comprises an automatic brake controller. If the intention determiner determines that the driver intends to decelerate the host vehicle, the automatic brake controller automatically brakes the host vehicle in order to assist the driver in decelerating the host vehicle.

With the above arrangement, if the driver is judged as intending to decelerate the host vehicle, the host vehicle can be brought more quickly to a constant-speed traveling mode at the target cruising speed.

According to the present invention, the intention determining reaction force is applied to the accelerator pedal during the intention determining period, whereupon the intention of the driver to adjust the vehicle speed is determined from the accelerator pedal depressed angle, which is produced by the driver during the intention determining period. When there is a curved road in front of the host vehicle, or when the intervehicular distance to a leading vehicle decreases while the host vehicle is traveling, the reaction force applied to the accelerator pedal is increased, thereby temporarily returning the accelerator pedal in order for the host vehicle to be automatically decelerated. Even in such a situation, returning of the accelerator pedal is prevented from being recognized in error as having been intended by the driver. Therefore, the intention of the driver to adjust the vehicle speed can be determined accurately.

According to the present invention, the vehicle travel control apparatus further comprises an information acquirer for acquiring vehicle information, which is information concerning an external situation or a traveling state of a host vehicle while the host vehicle is traveling, a recommended speed setter for setting a recommended speed for the host vehicle depending on the vehicle information acquired by the information acquirer, and a recommended speed maintaining zone setter for setting a recommended speed maintaining zone as a zone for maintaining the recommended speed depending on the vehicle information acquired by the information acquirer. When the host vehicle enters the recommended speed maintaining zone, the reaction force controller controls the reaction force based on the recommended speed set by the recommended speed setter, and the recommended speed setter corrects the recommended speed depending on a determined result from the intention determiner.

With the above arrangement, when the reaction force applied to the accelerator pedal is controlled in order to assist the driver in driving the host vehicle based on the recommended speed depending on the external situation or the traveling state of the host vehicle, the recommended speed is corrected based on the vehicle speed adjusting intention of the driver. If the vehicle information acquired by the host vehicle is in error, or if the recommended speed, which depends on the external situation or the traveling state, deviates from the speed intended by the driver, it is possible to change the recommended speed in order to better reflect the intention of the driver. Consequently, the driver is prevented from feeling uncomfortable due to the recommended speed being set to an inappropriate value.

Since the recommended speed maintaining zone is provided for maintaining the recommended speed depending on the external situation or the traveling state, it is possible for the vehicle travel control apparatus to set a time until the control process for maintaining the recommended speed is performed. Therefore, the control process for maintaining the recommended speed can be performed only within an appropriate zone. After the host vehicle has left the recommended speed maintaining zone, a new recommended speed may be used, or the control process for maintaining the recommended speed may be canceled, so that a control process depending on a new external situation or a new traveling state can be performed by the driver or can be prompted by the vehicle travel control apparatus. From this viewpoint as well, it is also possible to prevent the driver from feeling ill at ease.

The intention determiner may determine the vehicle speed adjusting intention of the driver based on at least a change per unit time in the accelerator pedal depressed angle within the recommended speed maintaining zone. Therefore, in the recommended speed maintaining zone, it is possible to acquire the vehicle speed adjusting intention of the driver while the reaction force is simultaneously being applied to the accelerator pedal in order to drive the host vehicle automatically at the recommended speed. The driver feels less discomfort because of the fact that the reaction force corrects the recommended speed based on the driver's intention to adjust the vehicle speed.

The intention determiner may output a driver intention value for judging the speed adjusting intention depending on the change per unit time in the accelerator pedal depressed angle in the recommended speed maintaining zone, and the difference between the accelerator pedal depressed angle in the recommended speed maintaining zone and the accelerator pedal depressed angle at a time that the host vehicle enters the recommended speed maintaining zone. The recommended speed setter may correct the recommended speed in order to increase the recommended speed as the driver intention value increases. Since the intention of the driver to adjust the vehicle speed is determined depending on the difference between the accelerator pedal change at the time the host vehicle enters the recommended speed maintaining zone and the accelerator pedal depressed angle in the recommended speed maintaining zone, in addition to the change per unit time in the accelerator pedal depressed angle, the intention of the driver to adjust the vehicle speed is determined highly accurately. More specifically, even if the driver depresses the accelerator pedal gradually, the recommended speed increases accordingly as the driver intention value increases.

The information acquirer may acquire a curvature of a circling road in a planned route of the host vehicle. The recommended speed setter may set a recommended circling speed depending on the curvature of the circling road if the curvature of the circling road is judged as being equal to or greater than a predetermined value. The recommended speed maintaining zone setter may set, as the recommended speed maintaining zone, a zone extending from a point that is spaced a predetermined distance from the circling road prior to the circling road, and covering the circling road partially or wholly. The reaction force controller may control the reaction force in order to drive the host vehicle at the recommended circling speed from a point before the host vehicle enters the circling road and until the host vehicle enters the circling road within the recommended speed maintaining zone. The intention determiner may determine the speed adjusting intention from the point that is spaced the predetermined distance from the circling road prior to the circling road.

With the above arrangement, even on a curved road, the drive assistance (the output of the reaction force) given by the host vehicle can be controlled while properly reflecting the driver's intention to adjust the vehicle speed. Accordingly, the driver is assisted in driving the host vehicle along the curved road without feeling ill at ease.

If the information acquired from the information acquirer is in error and a circling road is not actually present, or if the information acquired from the information acquirer is of poor accuracy, the information can be corrected based on the driver's intention to adjust the vehicle speed.

The information acquirer may detect a leading vehicle or an obstacle in front of the host vehicle while the host vehicle is traveling straight. If the information acquirer detects the leading vehicle or the obstacle in front of the host vehicle, the recommended speed setter may set the recommended speed depending on the distance between the leading vehicle or the obstacle and the host vehicle. The reaction force controller may control the reaction force in order to achieve the recommended speed before the distance becomes equal to or smaller than a predetermined value. The intention determiner may determine the speed adjusting intention from the time at which the leading vehicle or the obstacle is detected.

With the above arrangement, when the host vehicle detects a leading vehicle or an obstacle while traveling along a straight road, the host vehicle sets a recommended speed and generates a reaction force to achieve the recommended speed, thereby making it possible to avoid the leading vehicle or the obstacle. In addition, if the driver recognizes the leading vehicle or the obstacle and reduces the distance to the leading vehicle or the obstacle in an effort to overtake the leading vehicle, the intention of the driver is given priority, and hence the driver is prevented from feeling a sense of discomfort while driving the host vehicle.

According to the present invention, when the reaction force applied to the accelerator pedal is controlled in order to assist the driver in driving the host vehicle based on the recommended speed, which depends on an external situation or a traveling state of the host vehicle, the recommended speed is corrected based on the intention of the driver to adjust the vehicle speed. If the vehicle information acquired by the host vehicle is in error, or if the recommended speed that depends on the external situation or the traveling state deviates from the speed intended by the driver, it is possible to change the recommended speed in order to better reflect the intention of the driver. Consequently, the driver is prevented from feeling ill at ease as a result of the recommended speed being set to an inappropriate value.

Further, since the recommended speed maintaining zone is provided for maintaining the recommended speed depending on the external situation or the traveling state, it is possible for the vehicle travel control apparatus to set the time until a control process for maintaining the recommended speed is performed. Therefore, the control process for maintaining the recommended speed can be performed only within an appropriate zone. After the host vehicle has left the recommended speed maintaining zone, a new recommended speed may be used, or the control process for maintaining the recommended speed may be canceled, so that a control process, which depends on a new external situation or a new traveling state, can be performed by the driver or be prompted by the vehicle travel control apparatus. From this point of view as well, it is also possible to prevent the driver from feeling ill at ease.

DESCRIPTION OF EMBODIMENTS

A first embodiment and a second embodiment of the present invention will be described below with reference to the drawings.

[First Embodiment]

Figure 1:
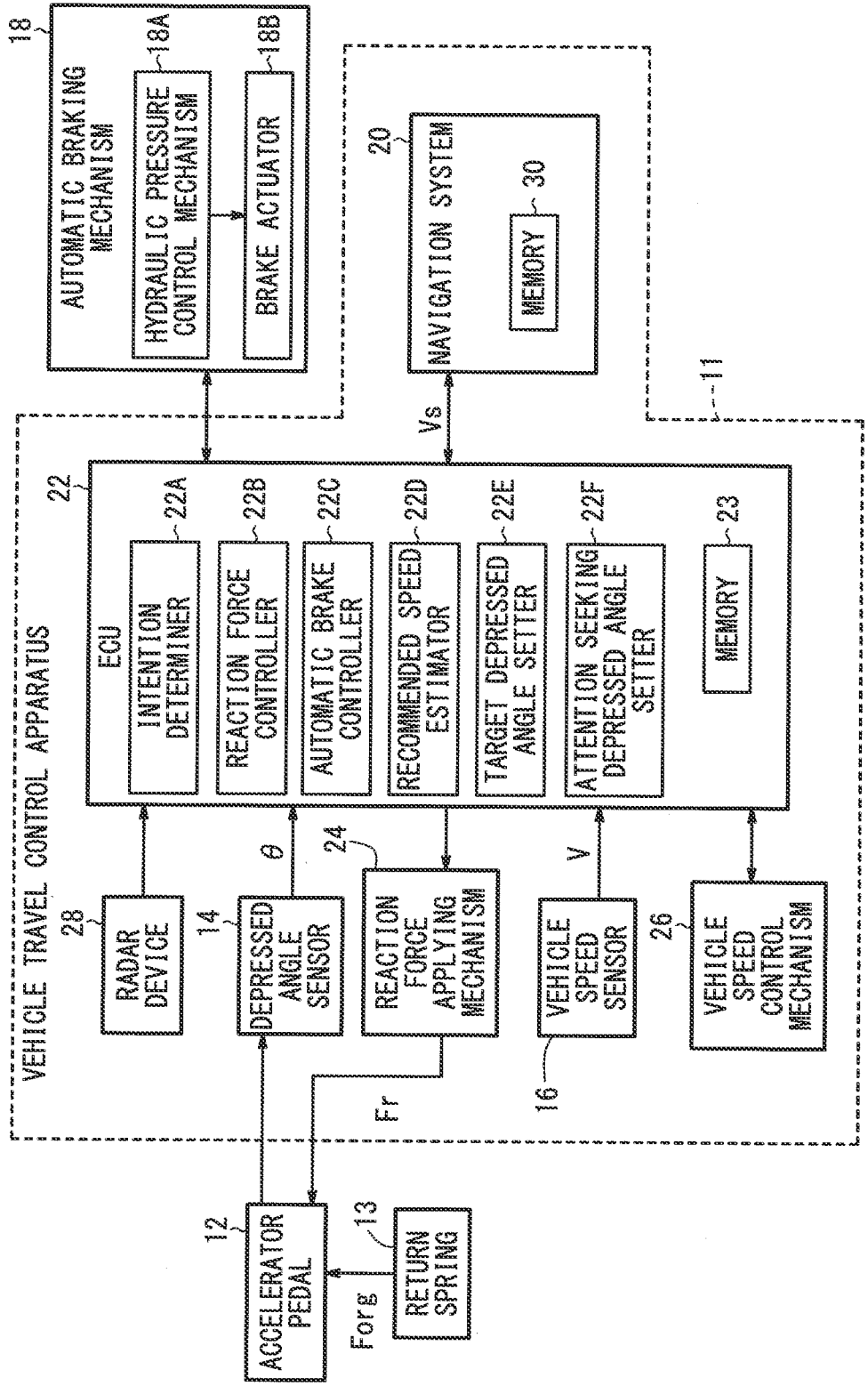
FIG. 1 is a block diagram of a vehicle, which incorporates therein a vehicle travel control apparatus according to a first embodiment of the present invention.

FIG. 1 is a block diagram of a vehicle 10 incorporating therein a vehicle travel control apparatus 11 according to a first embodiment of the present invention. The vehicle 10 includes an accelerator pedal 12, a return spring 13 for applying a reaction force Forg (also referred to as an "original position returning force Forg") [N] as an original position returning force to the accelerator pedal 12, a depressed angle sensor 14 (accelerator pedal depressed angle sensor), a vehicle speed sensor 16 (speedometer), an automatic braking mechanism 18, a navigation system 20, an ECU (electronic control unit) 22, a reaction force applying mechanism 24, a vehicle speed control mechanism 26, and a radar device 28. Among these components, the depressed angle sensor 14, the vehicle speed sensor 16, the radar device 28, the navigation system 20, the ECU 22, the vehicle speed control mechanism 26, and the reaction force applying mechanism 24 jointly make up the vehicle travel control apparatus 11.

The accelerator pedal depressed angle sensor 14 detects, with a potentiometer or the like, a depressed angle (accelerator pedal depressed angle θ [degrees]) through which the accelerator pedal 12 is depressed from an original position (θ=0 [degrees]), and outputs the detected accelerator pedal depressed angle θ to the ECU 22.

The vehicle speed sensor 16 measures a vehicle speed (present vehicle speed) V [km/h] of the vehicle 10, and outputs the measured vehicle speed V to the ECU 22.

The automatic braking mechanism 18 includes a hydraulic pressure control mechanism 18A and a brake actuator 18B. The brake actuator 18B comprises disc brakes, etc., for applying braking forces to four road wheels (not shown) of the vehicle 10. The braking forces (braking hydraulic forces) generated by the brake actuator 18B are controlled by respective pressure regulators (not shown) in the hydraulic pressure control mechanism 18A. The hydraulic pressure control mechanism 18A generates a braking hydraulic pressure, which depends on the depressed angle of a brake pedal (not shown), and also generates a braking hydraulic pressure, which depends on a braking force command value output from an automatic brake controller 22C of the ECU 22 independently of the brake pedal. The hydraulic pressure control mechanism 18A outputs the generated braking hydraulic pressure to the brake actuator 18B.

The navigation system 20, which is able to detect the position of the vehicle 10 in cooperation with a GPS (Global Positioning System), includes a memory 30 for storing information such as recommended speeds Vs [km/h] for certain roads.

The recommended speed Vs refers to a speed for optimizing mileage depending on a given road situation, i.e., a so-called cruising speed, and also for limiting the speed for a road. The speed for optimizing mileage may be preset depending on the mileage performance of the vehicle 10, the gradient of the road, the type of road (asphalt road, gravel road, or other road), and whether or not the road has curves.

The term "cruising" as used herein refers to a mode during which the vehicle travels continuously at a constant speed. The phrase "traveling at a cruising speed" as used herein refers to traveling at a constant speed in a most economical manner, i.e., traveling at the cruising speed.

In addition to referring to a mileage optimizing speed and a limit speed, a recommended speed Vs can be guessed and determined, i.e., estimated, by a recommended speed estimator 22D of the ECU 22, from one or more of distance information representing the distance to a leading vehicle that can be detected by the radar device 28, information concerning operations of windshield wipers and a raindrop sensor, the history of past traffic accidents on a road, the actual driving speed on a road (which is calculated by a traffic management center from driving speeds of vehicles incorporating navigation systems on the road that have been sent to the traffic management center), a road environment (suburban area, urban area, residential area, or a school zone), the road width, the number of lanes on the road, road markings detected by image processing, and information concerning a coefficient of friction of the road.

The recommended speed estimator 22D estimates as the recommended speed Vs a lower one of two recommended speeds Vs, i.e., a recommended speed Vs guessed and determined (estimated) depending on the position of the vehicle 10, which is detected by the navigation system 20 and sent to the recommended speed estimator 22D, or a recommended speed Vs determined based on an intervehicular distance to a leading vehicle, which is detected by the radar device 28, and a relative vehicle speed with respect to the leading vehicle.

The ECU 22 also includes a reaction force controller 22B, which calculates a reaction force Fr applied to the accelerator pedal 12 using the recommended speed Vs and the present speed V, generates a control signal based on the calculated reaction force Fr, and applies a control signal to the reaction force applying mechanism 24 in order to enable the reaction force applying mechanism 24 to apply the reaction force Fr [N] to the accelerator pedal 12.

More specifically, the reaction force applying mechanism 24 comprises a motor or the like, not shown, which is coupled to the accelerator pedal 12, and the reaction force applying mechanism 24 applies the reaction force Fr to the accelerator pedal 12 depending on the control signal received from the ECU 22.

Therefore, in addition to the original position returning force Forg [N] (a force tending to return the accelerator pedal 12 to the original position θ=0 [degrees] when the driver releases the driver's foot from the accelerator pedal 12) applied from the return spring 13 to the accelerator pedal 12, the reaction force Fr [N] from the reaction force applying mechanism 24 also is applied to the accelerator pedal 12.

The vehicle speed control mechanism 26 includes a throttle valve, the opening of which is controlled by a so-called drive-by-wire system, and a transmission system.

The ECU 22 operates as a function performing unit (function performing means), which performs various functions when a CPU executes programs stored in a memory 23 such as a ROM, etc., based on various input signals.

According to the first embodiment, the ECU 22 functions as an intention determiner 22A for determining the intention of the driver to adjust the vehicle speed, a reaction force controller 22B, an automatic brake controller 22C, a recommended speed estimator 22D, a target depressed angle setter (also referred to as a "target cruising speed/target depressed angle setter") 22E, and an attention seeking depressed angle setter 22F. Apart from the ROM, the memory 23 may comprise a flash memory, an EEPROM, a RAM, a hard disk, or the like.

The vehicle travel control apparatus 11 according to the first embodiment is basically constructed and operates as described above. An operation sequence (processing sequence) of the intention determiner 22A for determining the intention of the driver to adjust the speed of the vehicle will be described in detail below with reference to the flowcharts shown in FIGS. 2 and 3.

Figure 2:
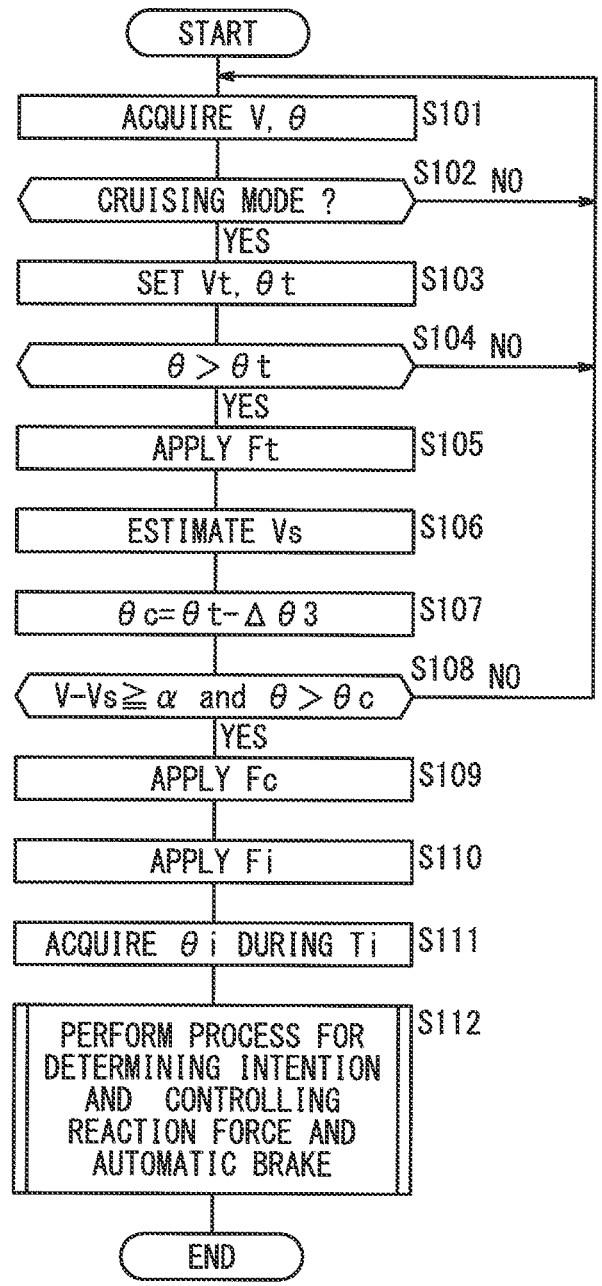
FIG. 2 is a flowchart of a processing sequence for determining an intention of the driver to adjust the vehicle speed of the vehicle.

In step S101, while the vehicle 10 is traveling, the ECU 22 detects (acquires) the present vehicle speed V through the vehicle speed sensor 16, and detects (acquires) the present accelerator pedal depressed angle θ through the depressed angle sensor 14. Actually, the vehicle speed V and the accelerator pedal depressed angle θ are detected successively per each given time td, e.g., at each of times on the order of ms (milliseconds), while the flowchart shown in FIG. 2 is executed during traveling of the vehicle 10.

In step S102, the ECU 22, which also functions as a cruising mode determiner, judges whether or not the vehicle 10 is in a cruising mode (constant-speed traveling mode).

More specifically, the ECU 22 judges whether or not the vehicle 10 is in a constant-speed traveling mode during a certain time period by referring to the following inequalities (1) and (2).

$$V - \Delta V_1 \leq V \leq V + \Delta V_1 \quad (1)$$

where $\Delta V_1$ is a constant representing a very small speed.

$$\theta - \Delta \theta_1 \leq \theta \leq \theta + \Delta \theta_1 \quad (2)$$

where $\Delta \theta_1$ is a constant representing a very small accelerator pedal depressed angle.

The ECU 22 repeats the process of step S101 and the judgment of step S102 for a certain period, e.g., 5 [sec]. The ECU 22 decides that the vehicle 10 is in a cruising mode cruising at a constant speed when the present vehicle speed V is stable, with any deviations being maintained within a range of very small speeds of ±ΔV1, and when the present accelerator pedal depressed angle θ is stable, with any deviations being maintained in a range of very small accelerator pedal depressed angles of ±Δθ1.

Then, in step S103, the ECU 22, which functions as the target cruising speed/target depressed angle setter 22E, sets, as a target speed (also referred to as a "target cruising speed") Vt, the present vehicle speed V of the vehicle 10 that is in the cruising mode (constant-speed traveling mode), and also sets the present accelerator pedal depressed angle θ as a target accelerator pedal depressed angle (also referred to as a "target cruising accelerator pedal depressed angle") θt.

In step S104, the ECU 22 judges whether or not the present accelerator pedal depressed angle θ exceeds the target accelerator pedal depressed angle θt. If the present accelerator pedal depressed angle θ exceeds the target accelerator pedal depressed angle θt (θ>θt or θ>θt+Δθ2 where Δθ2 represents a margin), then in step S105, the reaction force controller 22B applies a cruising reaction force Ft to the accelerator pedal 12 through the reaction force applying mechanism 24.

In step S106, the recommended speed estimator 22D estimates a recommended speed Vs. If the navigation system 20 detects an approaching curved road in the travel direction, the navigation system 20 estimates a recommended speed Vs, which is lower than the present vehicle speed V. If the inter-vehicular distance to a leading vehicle is decreasing, then the radar device 28 estimates a recommended speed Vs, which is lower than the present vehicle speed V. If both of the recommended speeds Vs are estimated, then a lower one of the recommended speeds is selected as the recommended speed Vs.

When a recommended speed Vs is estimated, in step S107, the ECU 22, which functions as an attention seeking depressed angle setter 22F, sets an attention seeking accelerator pedal depressed angle θc, which is an accelerator pedal depressed angle for driving at the estimated recommended speed Vs, according to the following equation (3).

$$\theta c = \theta t - \Delta\theta 3 \quad (3)$$

where Δθ3 represents the difference between the target accelerator pedal depressed angle θt and the attention seeking accelerator pedal depressed angle θc. Δθ3 may be a constant value.

In step S108, in order to judge whether or not an attention seeking reaction force Fc should be applied, the ECU 22 judges whether or not the following inequalities (4) are satisfied.

$$V - Vs \geq \alpha \text{ and } \theta > \theta c \quad (4)$$

If the present speed V is higher than the recommended speed Vs by a speed α (α may be a predetermined constant), and the present accelerator pedal depressed angle θ is greater than the attention seeking accelerator pedal depressed angle θc, then in step S109, the ECU 22 applies an attention seeking reaction force Fc, which is considerably greater than the cruising reaction force Ft (Fc>>Ft) that was applied from step S105, for a predetermined period (attention seeking reaction force applying period), e.g., 1 [sec].

After the attention seeking reaction force Fc has been applied for the predetermined period, then in step S110, the ECU 22 applies an intention determining reaction force Fi for an intention determining period Ti, e.g., 3 [sec]. As indicated by the following inequality (5), the intention determining reaction force Fi is set to be smaller than the attention seeking reaction force Fc and greater than the cruising reaction force Ft.

$$Fc > Fi > Ft \quad (5)$$

Then, in step S111, the ECU 22 acquires an accelerator pedal depressed angle θ during the intention determining period Ti (hereinafter referred to as an "intention determining accelerator pedal depressed angle θi").

The intention determining accelerator pedal depressed angle θi is represented by a value, which is produced by acquiring a prescribed number of accelerator pedal depressed angles θ in respective given periods td during the intention determining period Ti, successively integrating maximum values of the accelerator pedal depressed angles θ, and averaging the integration results with the number of the integrals, i.e., an average value representing the average of the integrals of the maximum values. A value (the aforementioned average value) upon elapse of the intention determining period Ti is used as the intention determining accelerator pedal depressed angle θi. Alternatively, a maximum value during the intention determining period Ti may be used as the intention determining accelerator pedal depressed angle θi.

In step S112, the intention determiner 22A determines the intention of the driver to adjust the vehicle speed based on the value of the intention determining accelerator pedal depressed angle θI, which has been acquired upon elapse of the intention determining period Ti, determines a reaction force Fr to be applied, and performs a control process for judging whether or not the vehicle 10 should be braked automatically by the automatic braking mechanism 18, i.e., performs a process for determining the driver's intention, and for controlling a reaction force and an automatic brake.

Figure 3:
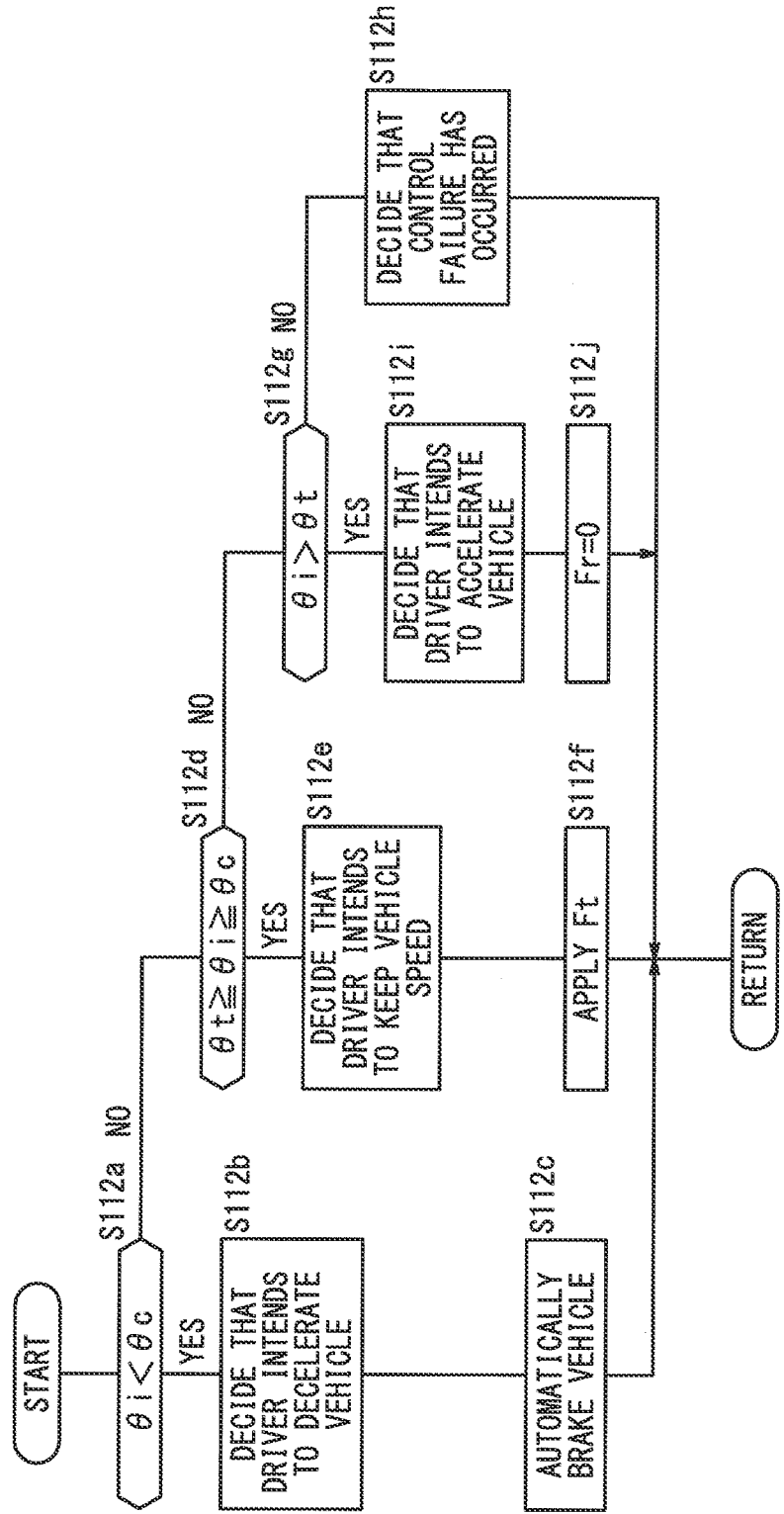
FIG. 3 is a detailed flowchart of a process for determining the driver's intention and controlling a reaction force and an automatic brake in the processing sequence shown in FIG. 2.

FIG. 3 is a detailed flowchart of a process for determining the driver's intention and for controlling a reaction force and an automatic brake, which is carried out in step S112. In the flowchart shown in FIG. 3, steps S112a, 112d, 112g may be carried out in any desired order. Decisions to proceed to one of different alternative paths may be made not only by the if-branches shown in FIG. 3, but also by using tables and characteristic diagrams.

As shown in FIG. 3, in step S112a, the intention determiner 22A judges whether or not the intention determining accelerator pedal depressed angle θi is smaller than the attention seeking accelerator pedal depressed angle θc. If the intention determining accelerator pedal depressed angle θi is smaller than the attention seeking accelerator pedal depressed angle θc, then in step S112b, the intention determiner 22A determines that the driver intends to decelerate the vehicle 10. In step S112c, the automatic brake controller 22C automatically brakes the vehicle 10 in order to assist the driver in decelerating the vehicle 10.

Figure 4:
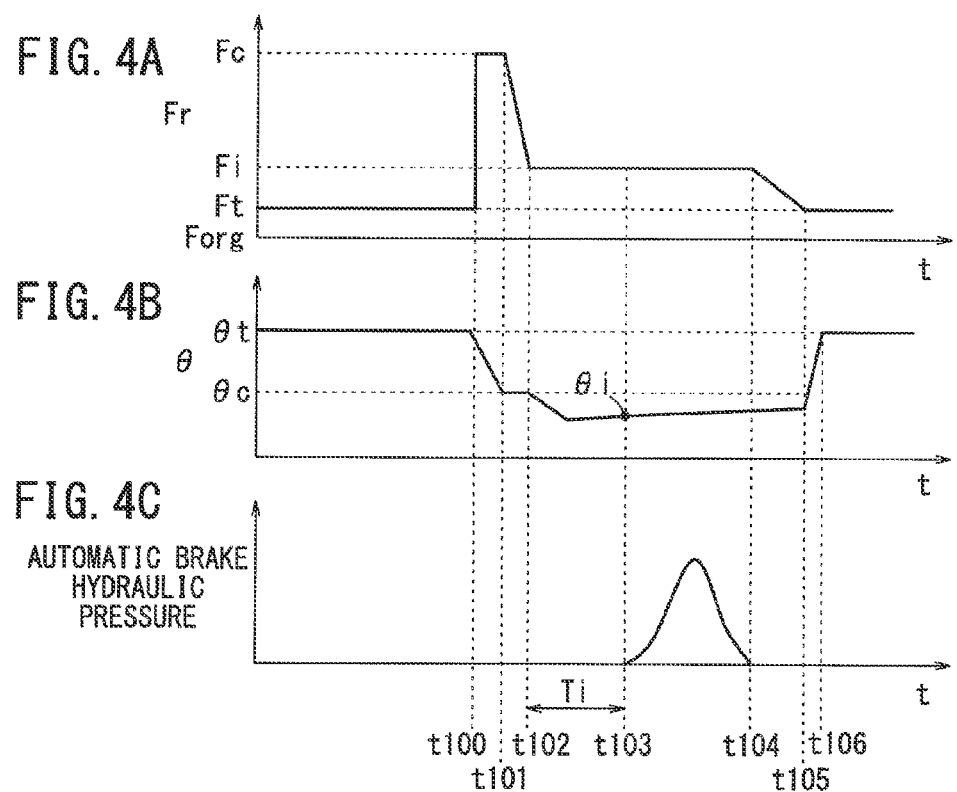
FIG. 4A is a diagram showing how the reaction force transitions when the driver intends to decelerate the vehicle.
FIG. 4B is a diagram showing how the depressed angle of an accelerator pedal transitions when the driver intends to decelerate the vehicle.
FIG. 4C is a diagram showing how the hydraulic pressure of the automatic brake transitions when the driver intends to decelerate the vehicle.

A process for determining the driver's intention and controlling the automatic brake in the event that the driver intends to decelerate the vehicle 10 will be described in detail below with reference to the timing charts shown in FIGS. 4A through 4C. In FIG. 4A, a reaction force Fr at the origin, i.e., the point of intersection between the time axis t and the reaction force Fr axis, represents the original position returning force Forg applied to the accelerator pedal 12. The same definition applies also to FIGS. 5A and 6A.

As shown in FIG. 4A, at time t100, the decision in step S108 is affirmative (step S108: YES), and in step S109, the attention seeking reaction force Fc begins to be applied to the accelerator pedal 12. During the period from time t100 to time t101, the attention seeking reaction force Fc is continuously applied to the accelerator pedal 12 in step S109. During the period from time t101 to time t102, the attention seeking reaction force Fc is sharply reduced. At time t102, and in step S110, the intention determining reaction force Fi begins to be applied to the accelerator pedal 12. Basically, the intention determining reaction force Fi is applied continuously to the accelerator pedal 12 until time t103, at which point the intention determining period Ti elapses.

Since at time t103, when the intention determining period Ti elapses, the intention determining accelerator pedal depressed angle θi is smaller than the attention seeking accelerator pedal depressed angle θc (step S112a: YES), as shown in FIG. 4B, the intention determiner 22A determines that the driver intends to decelerate the vehicle 10 in step S112b. As shown in FIG. 4C, in order to assist the driver in decelerating the vehicle 10, the automatic brake controller 22C controls the automatic braking mechanism 18 so as to brake the vehicle 10 automatically between time t103 and time t104.

The intention determining reaction force Fi is continuously applied to the accelerator pedal 12 until time t104 when automatic braking is ended, after which control returns to step S101.

According to the timing charts shown in FIGS. 4A and 4B, the cruising reaction force Ft is applied to the accelerator pedal 12, and the accelerator pedal depressed angle θ increases again at time t105. At time t106, the accelerator pedal depressed angle θ converges to the target cruising accelerator pedal depressed angle θt.

According to the control process carried out in steps S112a, S112b, and S112c, if there is a curved road in front of the vehicle 10, or if the intervehicular distance to a leading vehicle is becoming reduced, the recommended speed Vs is estimated as a low speed. When the attention seeking reaction force Fc is applied to the accelerator pedal 12, the driver returns the accelerator pedal 12 according to the applied attention seeking reaction force Fc. When the accelerator pedal depressed angle θ becomes smaller than the attention seeking accelerator pedal depressed angle θc, the vehicle 10 is braked automatically in order to assist the driver in decelerating the vehicle 10. At time t105, when the vehicle 10 has left the curved road or the intervehicular distance begins to increase, the driver depresses the accelerator pedal 12 in order to bring the accelerator pedal depressed angle θ back to the target cruising accelerator pedal depressed angle θt. However, in actuality, after time t106, a new target cruising accelerator pedal depressed angle θt and a new target cruising speed Vt are established immediately in steps S101 through S103.

In the flowchart of FIG. 3, if the decision in step S112a is negative (θi≥θc), then in step S112d, the intention determiner 22A judges whether or not the intention determining accelerator pedal depressed angle θi is within a range that is equal to or greater than the attention seeking accelerator pedal depressed angle θc, and equal to or smaller than the target cruising accelerator pedal depressed angle θt (θt≥θi≥θc).

If the intention determining accelerator pedal depressed angle θi lies within the above range, then in step S112e, the intention determiner 22A determines that the driver intends to maintain the present vehicle speed V. In step S112f, the reaction force controller 22B applies the cruising reaction force Ft to the accelerator pedal 12.

A control process, which is carried out when the driver intends to maintain the present vehicle speed V, will be described in detail below with reference to the timing charts shown in FIGS. 5A through 5D.

Figure 5:
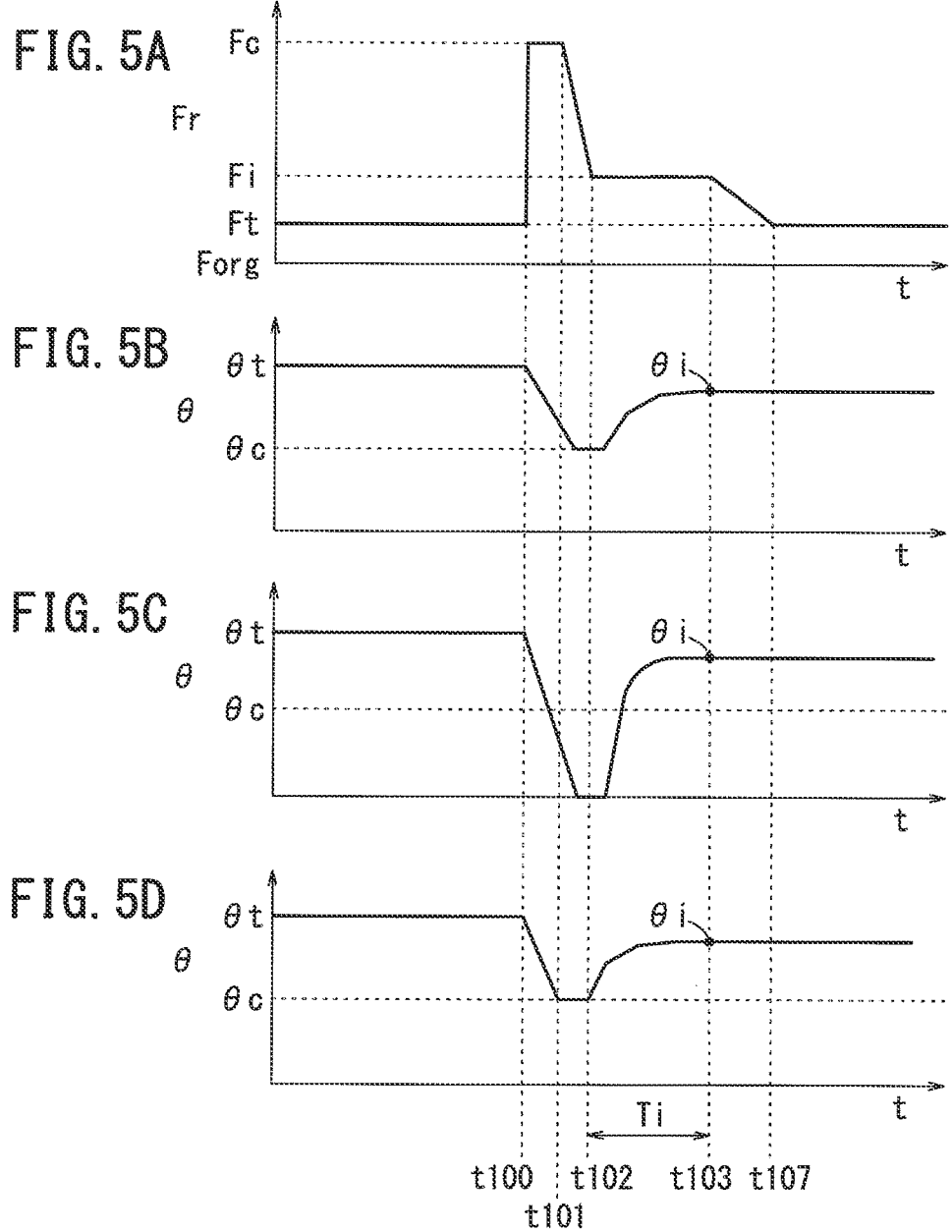
FIG. 5A is a diagram showing how the reaction force transitions when the driver intends to maintain a certain vehicle speed.
FIG. 5B is a general diagram showing how the depressed angle of the accelerator pedal transitions when the driver intends to maintain the vehicle speed.
FIG. 5C is a diagram showing how the depressed angle of the accelerator pedal transitions when the driver releases the accelerator pedal, at a time that an attention seeking reaction force is applied to the accelerator pedal.
FIG. 5D is a diagram showing how the depressed angle of the accelerator pedal transitions while the driver imposes a load on the accelerator pedal by placing the driver's foot thereon.

At time t100 (step S109) shown in FIG. 5A, the attention seeking reaction force Fc begins to be applied to the accelerator pedal 12. The attention seeking reaction force Fc is applied continuously to the accelerator pedal 12 during the period from time t100 to time t101. During the period from time t101 to time t102, the attention seeking reaction force Fc is sharply reduced. At time t102, and in step S110, the intention determining reaction force Fi begins to be applied to the accelerator pedal 12. The intention determining reaction force Fi is applied continuously to the accelerator pedal 12 until time t103, at which point the intention determining period Ti elapses.

Since, as shown in FIG. 5B, at time t103 when the intention determining period Ti elapses, the intention determining accelerator pedal depressed angle θi is greater than the attention seeking accelerator pedal depressed angle θc and smaller than the target cruising accelerator pedal depressed angle θt (step S112d: YES), in step S112e, the intention determiner 22A determines that the driver intends or essentially intends to maintain the vehicle speed. As shown in FIG. 5A, during the period from time t103 to time t107, the intention determining reaction force Fi is restored to the cruising reaction force Ft.

If the driver releases the accelerator pedal 12 at time t100 during a time that the attention seeking reaction force Fc is being applied to the accelerator pedal 12, then the accelerator pedal depressed angle θ becomes θ=0, i.e., the accelerator pedal 12 returns to the original position, in which the engine (not shown) of the vehicle 10 is idling, as indicated by the transition (time-dependent change) of the accelerator pedal depressed angle θ shown in FIG. 5C.

The transition (time-dependent change) of the accelerator pedal depressed angle θ, which is shown in FIG. 5D, indicates that the driver is imparting a load to the accelerator pedal 12 by placing the driver's foot thereon. In this case, when the intention determining reaction force Fi begins to be applied to the accelerator pedal 12 at time t102, the driver naturally depresses the accelerator pedal 12 as the reaction force decreases. In actuality, after time t103, steps S101 through S103 are executed in order to set the target cruising accelerator pedal depressed angle θt to the current new target cruising speed Vt (constant speed).

If the decision in step S112d is negative, then in step S112g, the intention determiner 22A judges whether or not the intention determining accelerator pedal depressed angle θi is equal to or greater than the target cruising accelerator pedal depressed angle θt. If the decision in step S112g is negative, then in step S112h, the intention determiner 22A determines that a control failure has occurred, stops the process for determining the driver's intention to adjust the vehicle speed, and indicates to the driver that a control failure has occurred through the navigation system 20 or the like.

If the decision in step S112g is affirmative, then in step S112i, the intention determiner 22A determines that the driver intends to accelerate the vehicle 10. In step S112j, the reaction force controller 22B stops applying the reaction force Fr to the accelerator pedal 12.

A control process carried out when the driver intends to accelerate the vehicle 10 will be described in detail below with reference to the timing charts shown in FIGS. 6A through 6C.

Figure 6:
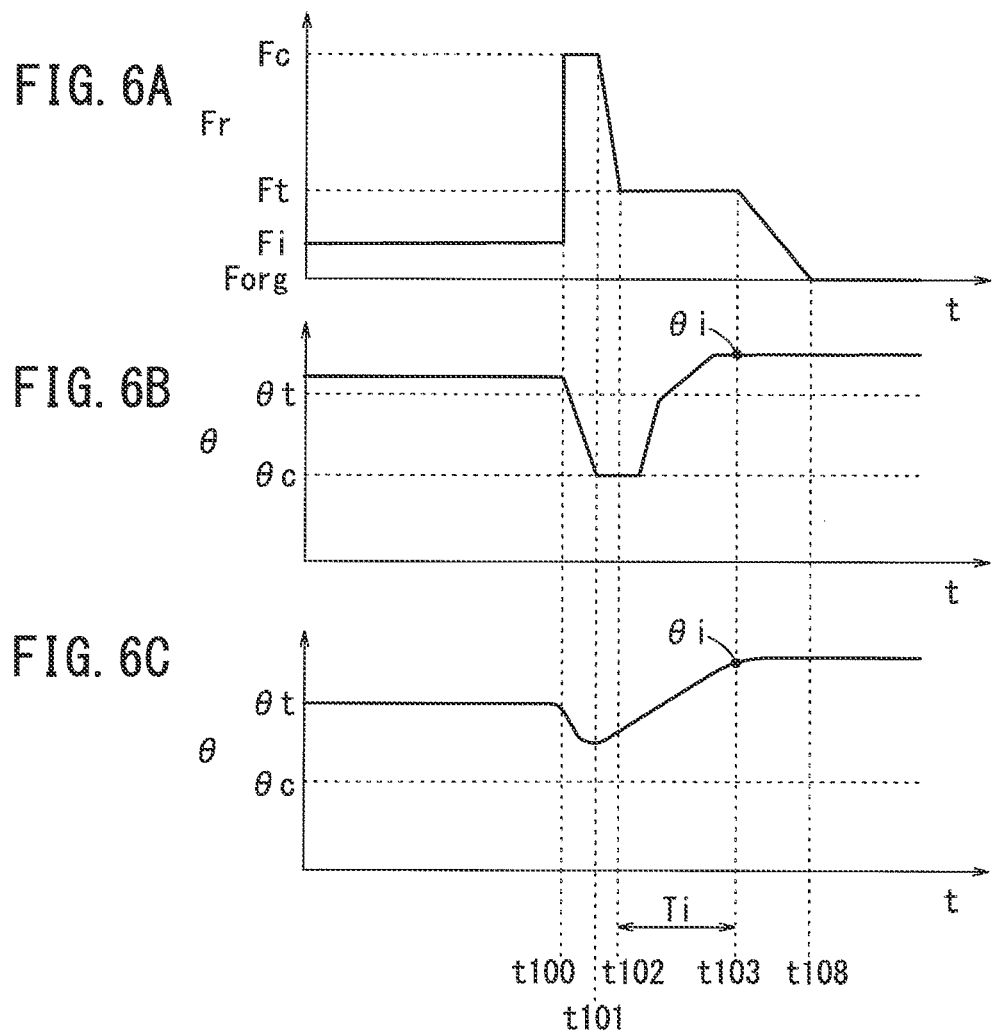
FIG. 6A is a diagram showing how the reaction force transitions when the driver intends to accelerate the vehicle.
FIG. 6B is a general diagram showing how the depressed angle of the accelerator pedal transitions when the driver intends to accelerate the vehicle.
FIG. 6C is a diagram showing how the depressed angle of the accelerator pedal transitions when the driver depresses the accelerator pedal in order to counteract the attention seeking reaction force.

At time t100 (step S109) shown in FIG. 6A, the attention seeking reaction force Fc begins to be applied to the accelerator pedal 12. During the period from time t100 to time t101, the attention seeking reaction force Fc is applied continuously to the accelerator pedal 12. During the period from time t101 to time t102, the attention seeking reaction force Fc is sharply reduced. At time t102, the intention determining reaction force Fi begins to be applied to the accelerator pedal 12 in step S110. The intention determining reaction force Fi is applied continuously to the accelerator pedal 12 until time t103, at which point the intention determining period Ti elapses.

At time t103 upon elapse of the intention determining period Ti, since as shown in FIG. 6B, the intention determining accelerator pedal depressed angle θi is greater than the target accelerator pedal depressed angle θt (step S112g: YES), the intention determiner 22A determines in step S112i that the driver intends to accelerate the vehicle. As shown in FIG. 6A, during the period from time t103 to time t108, the reaction force Fr is brought from the intention determining reaction force Fi to Fr=0, whereupon only the original position returning force Forg is applied as a reaction force to the accelerator pedal 12.

The transition (time-dependent change) of the accelerator pedal depressed angle θ, which is shown in FIG. 6C, indicates that the driver depresses the accelerator pedal 12 from time t100 while counteracting the attention seeking reaction force Fc. In this case, a new target cruising accelerator pedal depressed angle θt, as well as a new target cruising speed Vt, also are established in steps S101 through S103.

According to the first embodiment, as described above, the vehicle travel control apparatus 11 includes the reaction force controller 22B (accelerator reaction force controller) for controlling the reaction force Fr that is applied to the accelerator pedal 12, the depressed angle sensor 14 (accelerator pedal depressed angle sensor) for detecting the accelerator pedal depressed angle θ, which represents the depressed angle of the accelerator pedal 12, and the intention determiner 22A for determining the intention of the driver to adjust the vehicle speed based on the accelerator pedal depressed angle θ detected by the depressed angle sensor 14. For determining the driver's intention to adjust the vehicle speed, the reaction force controller 22B outputs the intention determining reaction force Fi, which serves as a reference, during the intention determining period Ti required in order to determine and verify the driver's intention. The intention determiner 22A determines the driver's intention to adjust the vehicle speed based on the accelerator pedal depressed angle θ, which is detected by the depressed angle sensor 14 during the intention determining period Ti.

With the above arrangement, the intention determining reaction force Fi is applied to the accelerator pedal 12 during the intention determining period Ti, and the intention of the driver to adjust the vehicle speed is determined from the accelerator pedal depressed angle θ, which is produced by the driver during the intention determining period Ti.

Even if the reaction force Fr applied to the accelerator pedal 12 increases and the accelerator pedal 12 is returned temporarily in order to automatically decelerate the vehicle 10, at a time that the vehicle 10 approaches a curved road or when the intervehicular distance to a leading car decreases while the vehicle 10 is traveling, since the intention determining period Ti is provided during which the intention determining reaction force Fi is applied, the returning movement of the accelerator pedal 12 is prevented from being mistakenly regarded as having been intended by the driver.

Consequently, the driver's intention to adjust the vehicle speed is determined accurately.

The vehicle travel control apparatus 11 also includes the recommended speed estimator 22D for estimating a recommended speed Vs for the vehicle 10 depending on the external situation around the vehicle 10 or the driving state of the vehicle 10, along with the vehicle speed sensor 16 for detecting the present vehicle speed V of the vehicle 10. The reaction force controller 22B judges whether or not it is necessary to seek the driver's attention based on the recommended speed Vs, which is estimated by the recommended speed estimator 22D, the present vehicle speed V, which is detected by the vehicle speed sensor 16, and the present accelerator pedal depressed angle θ, which is detected by the depressed angle sensor 14. If the reaction force controller 22B determines that it is necessary to seek the attention of the driver, preferably, the attention seeking reaction force Fc is applied, and thereafter, the intention determining reaction force Fi is applied, which is smaller than the attention seeking reaction force Fc.

With the above arrangement, inasmuch as the attention seeking reaction force Fc is applied with the intention determining reaction force Fi, which is smaller than the attention seeking reaction force Fc, being applied thereafter in order to determine the intention of the driver, the driver can be notified of an automatically determined situation in which the vehicle 10 needs to be decelerated. Since the driver's actual intention is confirmed after the driver's attention has been sought, the intention of the driver is given priority, even if the external situation or the driving state as determined by the vehicle 10 is recognized in error, or goes against the intention of the driver.

For example, the vehicle 10 applies the attention seeking reaction force Fc depending on the curvature of a curved road, based on information acquired from the navigation system 20 and the intervehicular distance to a leading vehicle, which is detected by the radar device 28. In other words, the vehicle 10 is decelerated based on a judgment made by the vehicle 10 itself.

If information (curvature or the like) of a curved road, which was acquired from the navigation system 20, is in error, or if the driver wants to accelerate the vehicle 10 in order to overtake a leading vehicle in spite of the decreasing intervehicular distance to the leading vehicle, then it can be assumed that the driver intends to accelerate the vehicle 10 or to maintain the present vehicle speed.

Thereafter, after the attention seeking reaction force Fc has been applied, the intention determining reaction force Fi is applied, whereby the intention of the driver is determined based on the action or behavior of the driver during the time that the intention determining reaction force Fi is being applied. Thus, the intention of the driver to adjust the vehicle speed is given priority over the assistive action and notice from the vehicle 10.

The vehicle travel control apparatus 11 also includes the target cruising speed/target depressed angle setter 22E for setting the target cruising accelerator pedal depressed angle θt, which is an accelerator pedal depressed angle θ for maintaining the target cruising speed Vt, and which is a speed at which the driver maintains the accelerator pedal depressed angle θ within a given range. In addition, the vehicle travel control apparatus 11 includes the attention seeking depressed angle setter 22F for setting the attention seeking accelerator pedal depressed angle θc, which is an accelerator pedal depressed angle θ that serves as a threshold value, by which it is judged whether or not to seek the driver's attention. If the actual accelerator pedal depressed angle θ detected by the depressed angle sensor 14 is greater than the target accelerator pedal depressed angle θt that was set by the target cruising speed/target depressed angle setter 22E, then the reaction force controller 22B applies the cruising reaction force Ft to the accelerator pedal 12 in order to maintain the target cruising speed Vt. If the present vehicle speed V detected by the vehicle speed sensor 16 exceeds by a predetermined value the recommended speed Vs estimated by the recommended speed estimator 22D, and if the present accelerator pedal depressed angle θ is greater than the attention seeking accelerator pedal depressed angle θc, then the reaction force controller 22B applies the attention seeking reaction force Fc, which is greater than the cruising reaction force Ft.

With the above arrangement, when the vehicle 10 starts to travel in the cruising mode at the target cruising speed Vt, the vehicle 10 is capable of judging whether or not the attention of the driver should be sought. Therefore, while the driver acts frequently on the accelerator pedal 12, the vehicle 10 does not seek the driver's attention. Accordingly, an attention seeking reaction force Fc that is not intended by the driver is prevented from being applied frequently to the accelerator pedal 12.

The intention determiner 22A determines that the driver intends to decelerate the vehicle 10 if the actual maximum value of the accelerator pedal depressed angle θ during the intention determining period Ti is smaller than the attention seeking accelerator pedal depressed angle θc, which was set by the attention seeking depressed angle setter 22F.

With the above arrangement, the driver's intention to decelerate the vehicle 10 can be determined.

The vehicle travel control apparatus 11 also includes the automatic brake controller 22C, which brakes the vehicle 10 automatically in order to assist the driver in decelerating the vehicle 10, if the intention determiner 22A determines that the driver intends to decelerate the vehicle 10.

With the above arrangement, when the intention determiner 22A determines that the driver intends to decelerate the vehicle 10, the vehicle 10 can be brought more quickly into a cruising mode at the target cruising speed Vt.

According to the processes of steps S101 through S103, after the target depressed angle setter (target cruising speed/target depressed angle setter) 22E has set the target cruising speed Vt and the target cruising accelerator pedal depressed angle θt, if a situation such as a curved road or a leading vehicle, which prevents the vehicle 10 from continuing to travel at the target cruising speed Vt and maintain the target cruising accelerator pedal depressed angle θt, i.e., a situation that prevents the vehicle 10 from traveling at the target cruising speed Vt, is considered to be present at a location ahead in the direction of travel, then the set target cruising speed Vt and the set target cruising accelerator pedal depressed angle θt are stored in the memory 23 of the ECU 22.

When the vehicle 10 encounters a situation that prevents the vehicle 10 from traveling at the target cruising speed Vt, the speed V and the accelerator pedal depressed angle θ change, respectively, from the target cruising speed Vt and the target cruising accelerator pedal depressed angle θt. For example, when the vehicle 10 travels along a curved road, the speed V drops and the accelerator pedal depressed angle θ is reduced. Alternatively, when the vehicle 10 overtakes a leading vehicle, the speed V rises and the accelerator pedal depressed angle θ is increased. Even in this case, at the time that the vehicle 10 becomes capable of traveling again at the target cruising speed Vt, for example, at a time that the vehicle 10 departs from the curved road and returns to a straight road, or at a time that the vehicle 10 completely finishes overtaking the leading vehicle, the target depressed angle setter (target cruising speed/target depressed angle setter) 22E reads the target cruising speed Vt and the target cruising accelerator pedal depressed angle θt, which are stored in the memory 23, and automatically restores (resets) the target cruising speed Vt and the target cruising accelerator pedal depressed angle θt. Thus, the vehicle travel control apparatus is capable of controlling driving of the vehicle 10 without causing the driver to feel uncomfortable.

[Second Embodiment]

1. Arrangement of Vehicle 10

Figure 7:
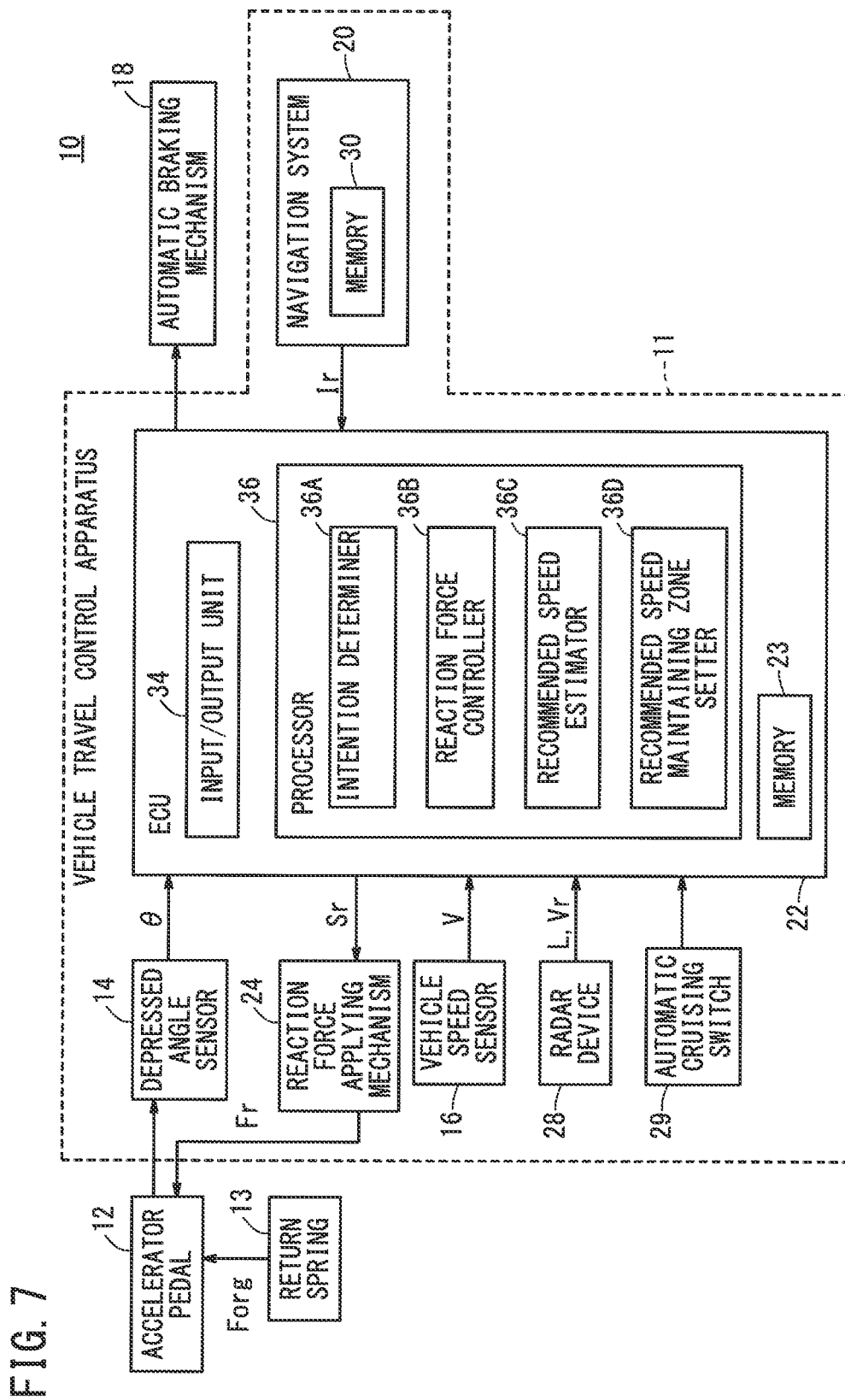
FIG. 7 is a block diagram of a vehicle, which incorporates therein a vehicle travel control apparatus according to a second embodiment of the present invention.

FIG. 7 is a block diagram of a vehicle 10, which incorporates therein a vehicle travel control apparatus 11 according to a second embodiment of the present invention. The vehicle 10 includes an accelerator pedal 12, a return spring 13 for applying a reaction force Forg to the accelerator pedal 12, a depressed angle sensor 14, a vehicle speed sensor 16, a radar device 28, an automatic cruising switch 29, a navigation system 20, an electronic control unit (ECU) 22, a reaction force applying mechanism 24, which comprises an actuator, and an automatic braking mechanism 18. Among these components, the depressed angle sensor 14, the vehicle speed sensor 16, the radar device 28, the automatic cruising switch 29, the navigation system 20, the ECU 22, and the reaction force applying mechanism 24 jointly make up the vehicle travel control apparatus 11.

The accelerator pedal depressed angle sensor 14 detects a depressed angle (hereinafter referred to as an "accelerator pedal depressed angle θ") [degrees] at which the accelerator pedal 12 is depressed from the original position thereof, and outputs the detected accelerator pedal depressed angle θ to the ECU 22. The vehicle speed sensor 16 measures a vehicle speed (present vehicle speed) V [km/h] of the vehicle 10, and outputs the measured vehicle speed V to the ECU 22.

The radar device 28, which also functions as an information acquirer (external situation information acquirer), transmits electromagnetic waves such as millimeter waves or the like as transmission waves forwardly of the vehicle 10, and based on reflected waves, detects the size of an obstacle, e.g., a leading vehicle, and the direction of the obstacle with respect to the vehicle 10 (host vehicle). At the same time, the radar device 28 also operates as a relative position detecting means for detecting a relative distance L [m] between the obstacle and the vehicle 10, or the intervehicular distance if the obstacle is a leading vehicle, and the relative speed Vr [km/h] between the obstacle and the vehicle 10. The radar device 28 sends the detection result to the ECU 22. Rather than a millimeter-wave radar, a laser radar or a stereographic camera may be used as the relative position detecting means for detecting the relative position of the obstacle with respect to the vehicle 10.

The navigation system 20, which also functions as an information acquirer (external situation information acquirer), is capable of operating in cooperation with a GPS (Global Positioning System) to detect the position of the vehicle 10. The navigation system 10 also includes a memory 30 for storing information Ir concerning roads that the vehicle 10 travels on. The information Ir includes information concerning the present position of the vehicle 10, as well as information concerning a curved road, which represents entrance and exit positions of the curved road, the curvature of the curved road, etc.

The automatic cruising switch 29 is a switch for turning on and off a device for keeping a constant vehicle speed V without the driver depressing the accelerator pedal 12 when the driver drives the vehicle 10 at a constant speed on a motorway or the like, such as an expressway on which vehicles are accelerated and decelerated less frequently. The automatic cruising switch 29 is operated by the driver.

The ECU 22 includes an input/output unit 34, a processor 36, and a memory 23. The input/output unit 34 sends signals to and receives signals from the depressed angle sensor 14, the vehicle speed sensor 16, the radar device 28, the navigation system 20, the reaction force applying mechanism 24, and the automatic braking mechanism 18.

The processor 36 functions as a driver intention determiner 36A (hereinafter referred to as an "intention determiner 36A"), a reaction force controller 36B, a recommended speed setter 36C, and a recommended speed maintaining zone setter 36D.

More specifically, the intention determiner 36A includes a function to determine the intention of the driver in relation to operation of the accelerator pedal 12 or adjustment of the speed V (e.g., an accelerating intention, a decelerating intention, a constant-speed traveling (cruising) intention, or a speed adjusting intention).

Figure 11:
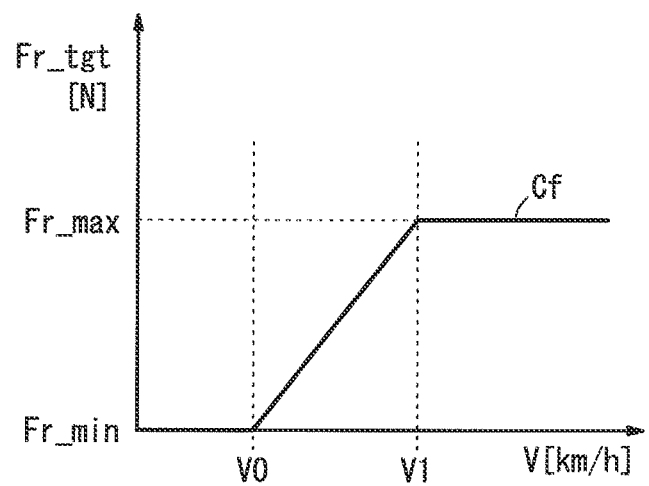
FIG. 11 is a diagram showing output characteristics of the reaction force by way of example.

The reaction force controller 36B includes a function to control a reaction force (hereinafter referred to as a "reaction force Fr") [N], which is generated by the reaction force applying mechanism 24 and applied to the accelerator pedal 12. More specifically, the reaction force controller 36B sets an output characteristic (hereinafter referred to as an "output characteristic Cf") of the reaction force Fr depending on a target value (hereinafter referred to as a "target speed Vtgt") for the speed V, which is used to control the reaction force Fr, and calculates a target value (hereinafter referred to as a "target reaction force Fr_tgt") for the reaction force Fr using the output characteristic Cf and the speed V detected by the vehicle speed sensor 16. The reaction force controller 36B then sends a control signal Sr, which represents the calculated target reaction force Fr_tgt, to the reaction force applying mechanism 24. As shown in FIG. 11, the output characteristic Cf of the reaction force Fr defines a relationship between the speed V and the target reaction force Fr_tgt with respect to respective values of the target speed Vtgt. Such a relationship is stored in the memory 23 of the ECU 22.

The recommended speed setter 36C includes a function to set a recommended speed Vrec [km/h], which is one type of the target speed Vtgt used in the reaction force controller 36B. The recommended speed Vrec is a target speed Vtgt, which is set depending on external situation information of the vehicle 10 (i.e., information concerning the environment around the vehicle 10). According to the second embodiment, the recommended speed Vrec includes a recommended circling speed Vrec_cir [km/h] at which the vehicle 10 is to travel at a constant speed along a circling road (a curved road or the like), and a recommended obstacle-approaching speed Vrec_app [km/h] at which the vehicle 10 should travel as the vehicle 10 approaches an obstacle (including a leading vehicle) on a straight road.

The recommended circling speed Vrec_cir is set depending on the curvature C of the circling road, and can be corrected by an action of the driver. The recommended obstacle-approaching speed Vrec_app is set depending on the relative distance L from the vehicle 10 (host vehicle) to an obstacle (leading vehicle or the like), and can be corrected by an action of the driver. A process for setting the recommended speed Vrec and a process for correcting the recommended speed Vrec will be described later.

The recommended speed maintaining zone setter 36D includes a function to set a recommended speed maintaining zone in which to maintain the recommended speed Vrec. The phrase "to maintain the recommended speed Vrec" implies maintaining the value of the recommended speed Vrec, provided that the value (recommended speed Vrec) thereof will be used at a subsequent time, even if the actual value of the recommended speed Vrec (e.g., the recommended circling speed Vrec_cir or the recommended obstacle-approaching recommended speed Vrec_app) is not used as a target value Vtgt at the present time.

When the vehicle 10 travels along a circling road, the recommended speed maintaining zone includes, in addition to the circling road (circling zone) itself partially or wholly, a zone prior to the circling zone (circling road approaching zone). When the vehicle 10 approaches an obstacle (including a leading vehicle) on a straight road, the recommended speed maintaining zone is defined as a zone that extends over a predetermined distance from the vehicle (host vehicle) up to the leading vehicle. The predetermined distance may become greater as the vehicle speed V is higher.

The memory 23, which may include a nonvolatile memory and a volatile memory, not shown, stores various programs and data, which are used by the processor 36.

The reaction force applying mechanism 24 comprises a motor, not shown, coupled to the accelerator pedal 12, which applies the reaction force Fr to the accelerator pedal 12 depending on a control signal Sr received from the ECU 22. Therefore, in addition to the returning force Forg applied from the return spring 13, the reaction force Fr from the reaction force applying mechanism 24 also is applied to the accelerator pedal 12. The reaction force applying mechanism 24 may alternatively comprise another drive force generating means (e.g., a pneumatic actuator).

The automatic braking mechanism 18 comprises a brake actuator or the like, not shown, which automatically applies a braking force based on a command from the ECU 22.

Figure 8:
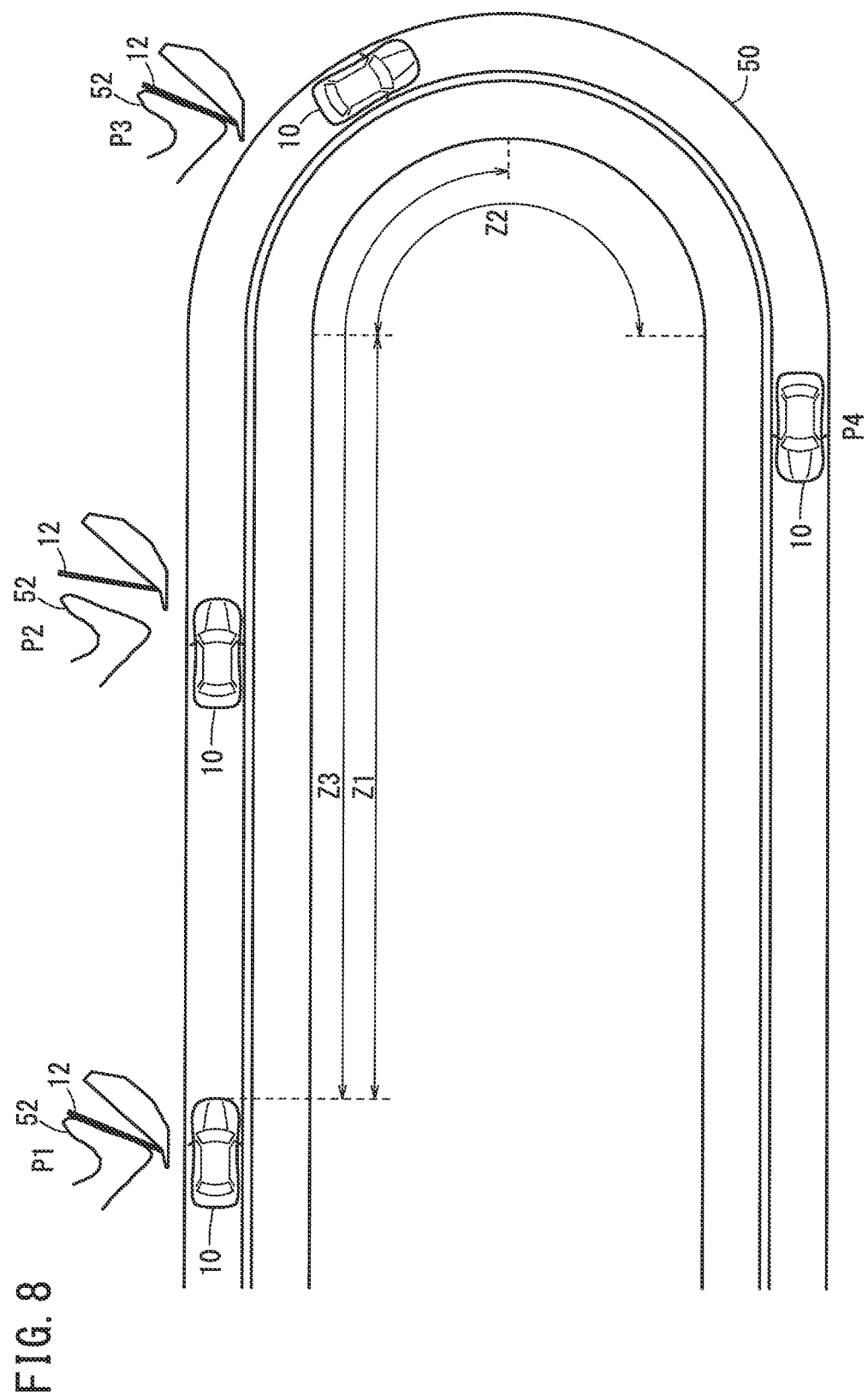
FIG. 8 is a view showing the manner in which the vehicle shown in FIG. 7 travels along a curved road and adjoining roads, and also the manner in which a driver's foot and an accelerator pedal work in cooperation as the vehicle travels.

2. Control of Reaction Force Fr (1) When the Vehicle 10 Travels Along a Curved Road:

FIG. 8 is a view showing the manner in which the vehicle 10 travels along a curved road 50 and adjoining roads, and also showing the manner in which a driver's foot 52 and the accelerator pedal 12 operate together as the vehicle 10 travels.

First, zones Z1 through Z3 shown in FIG. 8 will be described below. Zone Z1 is a straight zone (hereinafter referred to as a "curve approaching zone Z1") prior to the curved road 50. Zone Z2 is a curved zone (hereinafter referred to as a "circling zone Z2") comprising the curved road 50. Zone Z3 is a zone (hereinafter referred to as a "driver intention determining zone Z3" or simply an "intention determining zone Z3") for judging whether or not the driver intends to change the recommended speed Vrec.

The curve approaching zone Z1 is set depending on the distance to the entrance of the curved road 50 and the present speed V. As the speed V becomes higher, the curve approaching zone Z1 is set to a longer distance. Within the curve approaching zone Z1, the reaction force Fr is controlled to equalize the speed V to the circling recommended speed Vrec_cir at the time that the vehicle 10 enters the circling zone Z2. In the curve approaching zone Z1, the automatic braking mechanism 18 may be operated so as to make it possible for the speed V to become the recommended circling speed Vrec_cir more reliably at the time that the vehicle 10 enters the circling zone Z2.

According to the second embodiment, the circling zone Z2 basically is a zone within which the recommended speed Vrec is set and maintained as an actually used target speed Vtgt.

As shown in FIG. 3, the intention determining zone Z3 is a zone for determining the driver's intention in relation to correcting the recommended speed Vrec (in this case, the circling recommended speed Vrec_cir). The intention determining zone Z3 is made up of the curve approaching zone Z1 together with a front half of the circling zone Z2. However, the intention determining zone Z3 may start prior to the curve approaching zone Z1, or may end prior to or subsequent to the front half of the circling zone Z2.

Figure 9:
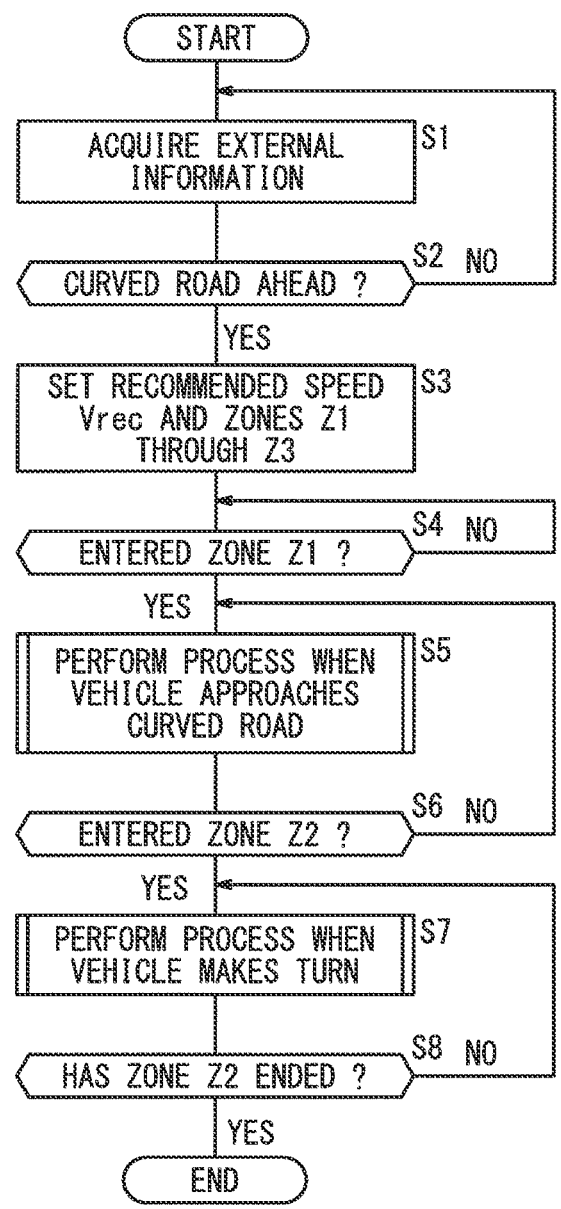
FIG. 9 is a flowchart of a processing sequence for controlling a reaction force during a time that the vehicle is traveling along the curved road.

FIG. 9 is a flowchart of a processing sequence for controlling the reaction force Fr during a time that the vehicle 10 travels along the curved road 50. In step S1, the processor 36 of the ECU 22 acquires external situation information from the navigation system 20. More specifically, the processor 36 acquires from the navigation system 20 information concerning whether there is a curved road having a curvature represented by a predetermined value C1 or greater within a given distance D1 [m] ahead of the vehicle 10 (hereinafter referred to simply as a "curved road"). The given distance D1 is set to a distance that is equal to or greater than the length of the curve approaching zone Z1.

In step S2, the processor 36 judges whether or not there is a curved road within the given distance D1 ahead of the vehicle 10. If there is not a curved road (S2: NO), then control returns to step S1. If there is a curved road (S2: YES), then control proceeds to step S3.

In step S3, the processor 36 sets a recommended speed Vrec (in this case, a circling recommended speed Vrec_cir) and zones Z1 through Z3. More specifically, the processor 36 sets a circling recommended speed Vrec_cir depending on the curvature C of the curved road 50, and also sets a curve approaching zone Z1 and an intention determining zone Z3 depending on the present speed V. Furthermore, the processor 36 sets a circling zone Z2 depending on the information Ir from the navigation system 20.

In step S4, the processor 36 judges whether or not the vehicle 10 (host vehicle) has entered the curve approaching zone Z1, based on the information Ir from the navigation system 20. If the vehicle 10 has not entered the curve approaching zone Z1 (S4: NO), then step S4 is repeated. If the planned route of the vehicle 10 changes and the curved road 50 is removed from the new planned route, then the present processing sequence may come to an end. The present processing sequence may also come to an end by way of other steps.

If the vehicle 10 has entered the curve approaching zone Z1 (S4: YES), then in step S5, the processor 36 performs a process as the vehicle 10 approaches the curved road 50.

Figure 10:
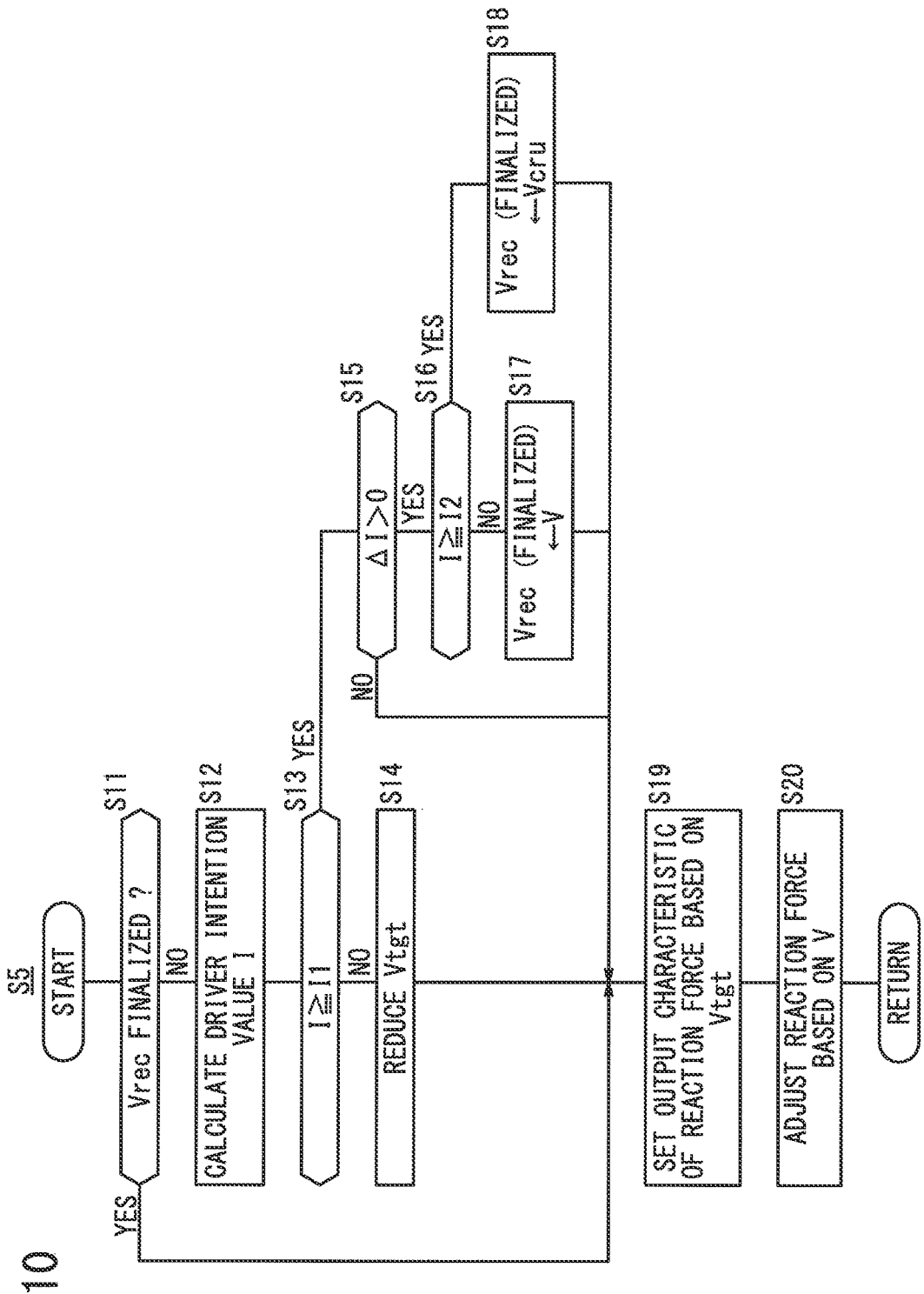
FIG. 10 is a flowchart of a process carried out when the vehicle approaches the curved road.

FIG. 10 is a flowchart of a process that is carried out when the vehicle 10 approaches the curved road 50. In step S11, the processor 36 judges whether or not the recommended speed Vrec has been finalized in the present process that is carried out when the vehicle 10 approaches the curved road 50. If the recommended speed Vrec has been finalized (S11: YES), then control proceeds to step S19. If the recommended speed Vrec has not been finalized (S11: NO), then control proceeds to step S12.

In step S12, the processor 36 calculates a driver intention value I (hereinafter referred to as an "intention value I"). The intention value I serves as a means for determining a speed adjusting intention of the driver, which is calculated according to the following equation (a).

$$I = K1 \times \theta dif + K2 \times (\theta crr - \theta init) \quad (a)$$

where θdif represents a change per unit time in the accelerator pedal depressed angle θ [degrees/sec] (hereinafter also referred to as am "accelerator pedal change θdif"), θcrr represents a present accelerator pedal depressed angle [degrees] (in the present processing cycle), θinit represents an accelerator pedal depressed angle θ [degrees] occurring at the instant the vehicle 10 enters the intention determining zone Z3 (which equals the instant that the vehicle 10 enters the curve approaching zone Z1 in the second embodiment), K1 represents a coefficient for correcting the accelerator pedal change θdif, and K2 represents a coefficient for correcting the difference between the accelerator pedal depressed angle θcrr and the accelerator pedal depressed angle θinit. Use of coefficients K1 and K2 makes it possible to adjust the weighting of the accelerator pedal change θdif, as well as the difference between the accelerator pedal depressed angle θcrr and the accelerator pedal depressed angle θinit.

In step S13, the processor 36 judges whether or not the intention value I is equal to or greater than a threshold value I1. The threshold value I1 serves to determine a speed adjusting intention of the driver. If the intention value I is equal to or greater than the threshold value I1, then it is judged that the driver intends to change the recommended speed Vrec.

If the intention value I is not equal to or greater than the threshold value I1 (S13: NO), then it can be determined that the driver does not intend to change the recommended speed Vrec, i.e., does not intend to increase the recommended speed Vrec. In step S14, the processor 36 reduces the recommended speed Vrec, thereby bringing the present target speed Vtgt to the recommended speed Vrec (recommended circling speed Vrec_cir), which was set in step S3. Then, control proceeds to step S19. If the intention value I is equal to or greater than the threshold value I1 (S13: YES), then control proceeds to step S15.

In step S15, the processor 36 judges whether or not a change ΔI per unit time in the intention value I is greater than zero, thereby making it possible to specify the extent of the driver's intention to accelerate the vehicle 10. If the change ΔI is equal to or smaller than zero (S15: NO), then control proceeds to step S19. If the change ΔI is greater than zero (S15: YES), then in step S16, the processor 36 judges whether or not the intention value I is equal to or greater than a threshold value I2. The threshold value I12 serves to determine a speed adjusting intention of the driver. If the intention value I is equal to or greater than the threshold value I2, then the driver is determined as intending to bring the recommended speed Vrec back to the target speed Vtgt (hereinafter referred to as a "target cruising speed Vcru") [km/h] before the vehicle 10 enters the curve approaching zone Z1.

If the intention value I is not equal to or greater than the threshold value I2 (S16: NO), then it can be determined that the driver intends for the present speed V to be set as the recommended speed Vrec. In step S17, the processor 36 sets (finalizes) the present speed V as the recommended speed Vrec, and maintains the value of the present speed V as the target speed Vtgt until the curve approaching zone Z1 ends.

If the intention value I is equal to or greater than the threshold value I2 (S16: YES), then the driver can be determined as intending to set the target cruising speed Vcru as the recommended speed Vrec immediately before the vehicle 10 enters the curve approaching zone Z1. In step S18, the processor 36 sets (finalizes) the target cruising speed Vcru as the recommended speed Vrec, and maintains the value of the target cruising speed Vcru as the target speed Vtgt until the curve approaching zone Z1 ends.

In step S19, based on the target speed Vtgt, the processor 36 sets an output characteristic Cf of the reaction force Fr. FIG. 11 shows by way of example an output characteristic Cf of the reaction force Fr.

As shown in FIG. 11, the output characteristic Cf defines a relationship between the speed V and the target reaction force Fr_tgt. When the speed V is lower than a predetermined threshold value V0, then the target reaction force Fr_tgt has a minimum value Fr_min (e.g., zero). When the speed V is equal to or greater than the threshold value V0 or equal to or smaller than a threshold value V1, the target reaction force Fr_tgt increases linearly. When the speed V exceeds the threshold value V1, the target reaction force Fr_tgt has a maximum value Fr_max.

As the target speed Vtgt goes higher, the threshold values V0, V1 become greater (are shifted to the right as shown in FIG. 11). As the target speed Vtgt goes lower, the threshold values V0, V1 become smaller (are shifted to the left as shown in FIG. 11). The relationship shown in FIG. 11 is represented as a map, which is stored in the memory 23 of the ECU 22.

In step S20, the processor 36 adjusts the reaction force Fr based on the speed V. More specifically, the processor 36 specifies a target reaction force Ft_tgt corresponding to the speed V on the output characteristic Cf that is set in step S19.

The processor 36 then controls the reaction force applying mechanism 24 in order to realize the specified target reaction force Ft_tgt.

In step S6 of FIG. 9, the processor 36 judges whether or not the vehicle 10 has entered the circling zone Z2 based on the information Ir from the navigation system 20. If the vehicle 10 has not entered the circling zone Z2 (S6: NO), then step S5 is repeated. Therefore, as long as the answer to step S6 in FIG. 9 is NO, the flowchart of FIG. 10 is repeated while the vehicle 10 remains within the curve approaching zone Z1.

If the vehicle 10 enters the circling zone Z2 (S6: YES), then in step S7, the processor 36 performs a process, which is carried out when the vehicle 10 makes a turn.

Figure 12:
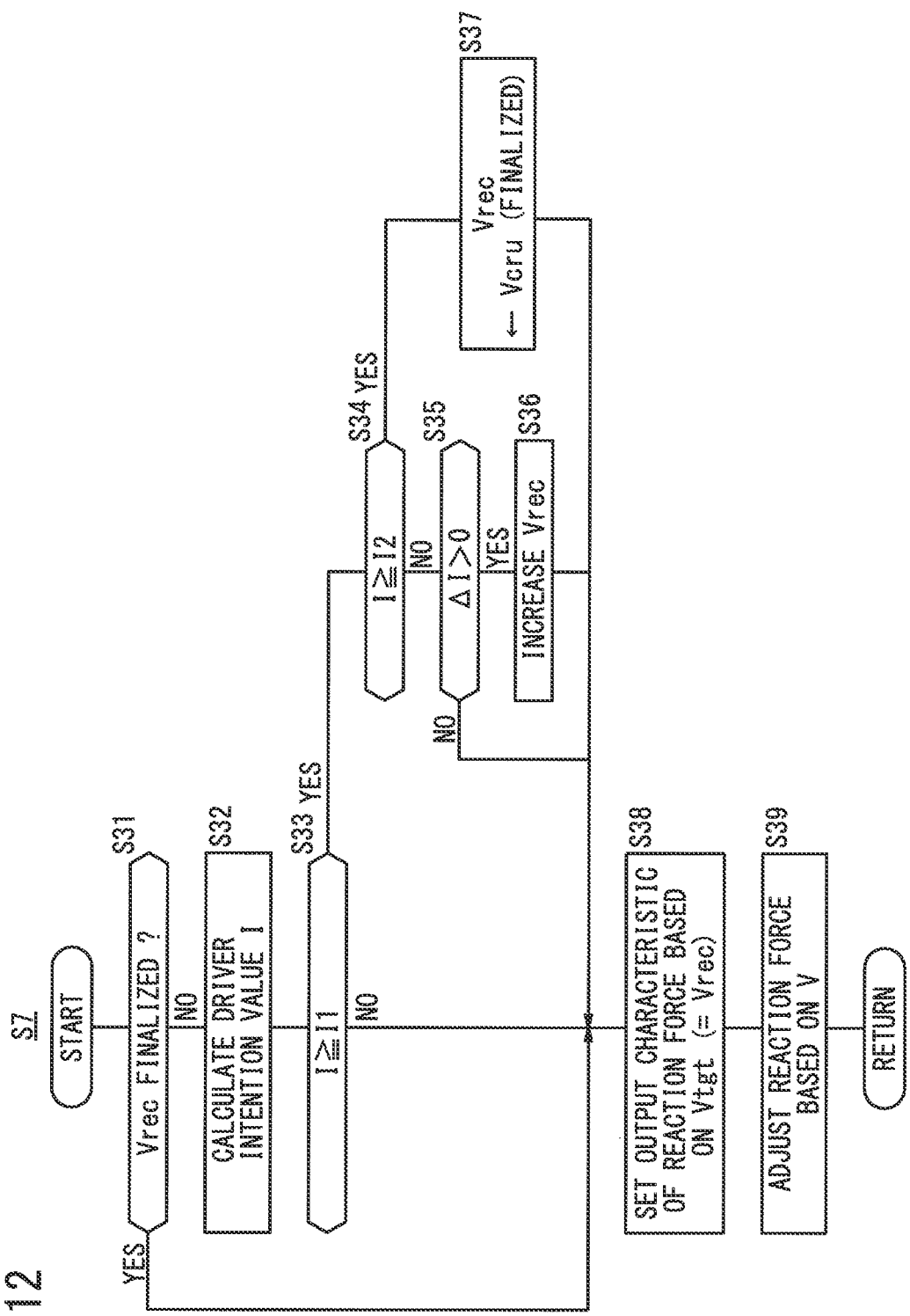
FIG. 12 is a flowchart of a process carried out when the vehicle makes a turn.

FIG. 12 is a flowchart of the process that is carried out when the vehicle 10 makes a turn. In step S31, the processor 36 judges whether or not the recommended speed Vrec has been finalized in the present process that is carried out when the vehicle 10 makes a turn. If the recommended speed Vrec has been finalized (S31: YES), then control proceeds to step S38. If the recommended speed Vrec has not been finalized (S31: NO), then control proceeds to step S32.

In step S32, the processor 36 calculates an intention value I. The processor 36 calculates the intention value I in the same manner as carried out in step S12 of FIG. 10.

In step S33, similar to step S13 of FIG. 10, the processor 36 judges whether or not the intention value I is equal to or greater than the threshold value I1. If the intention value I is not equal to or greater than the threshold value I1 (S33: NO), then control proceeds to step S38. If the intention value I is equal to or greater than the threshold value I1 (S33: YES), then control proceeds to step S34.

In step S34, the processor 36 judges whether or not the intention value I is equal to or greater than the threshold value I2. The threshold value I2 is the same as the threshold value I2 used in step S16 of FIG. 10.

If the intention value I is not equal to or greater than the threshold value I2 (S34: NO), then in step S35, the processor 365 judges whether or not the change ΔI per unit time in the intention value I is greater than zero, thereby making it possible to specify the extent of the driver's intention to accelerate the vehicle 10. If the change ΔI is equal to or smaller than zero (S35: NO), then control proceeds to step S38. If the change ΔI is greater than zero (S35: YES), then in step S36, the processor 36 increases the recommended speed Vrec. The processor 36 increases the recommended speed Vrec by an amount that becomes greater as the change ΔI is greater.

If the intention value I is equal to or greater than the threshold value I2 in step S34 (S34: YES), then it can be determined that the driver intends to restore the target cruising speed Vcru to the recommended speed Vrec immediately before the vehicle 10 enters into the curve approaching zone Z1. In step S37, the processor 36 sets (finalizes) the target cruising speed Vcru as the recommended speed Vrec, and maintains the value of the target cruising speed Vcru at the recommended speed Vrec until the circling zone Z2 ends.

In step S38, the processor 36 sets an output characteristic Cf of the reaction force Fr based on the target speed Vtgt. Unlike step S19, in step S38, the target speed Vtgt is set to a value that is equal to the recommended speed Vrec.

Step S39 is the same as step S20 of FIG. 10.

In step S8 of FIG. 9, the processor 36 judges whether or not the circling zone Z2 has ended based on the information Ir from the navigation system 20. If the circling zone Z2 has not ended, i.e., if the vehicle 10 is still traveling within the circling zone Z2, (S8: NO), then step S7 is repeated. Therefore, as long as the answer to step S8 of FIG. 9 is NO, the flowchart of FIG. 12 is repeated while the vehicle 10 remains within the circling zone Z2.

If the circling zone Z2 has ended (S8: YES), then the present processing sequence is terminated.

FIGS. 13 through 17 are timing charts showing examples of various values in the processing sequence according to the second embodiment shown in FIGS. 9, 10 and 12. In FIGS. 13 through 17, the driver intention value I in zones other than the curve approaching zone Z1 and the circling zone Z2 also is illustrated. The driver intention value I in such other zones merely is illustrated for facilitating understanding of the invention, and does not need to be calculated during the actual processing sequences.

Figure 13:
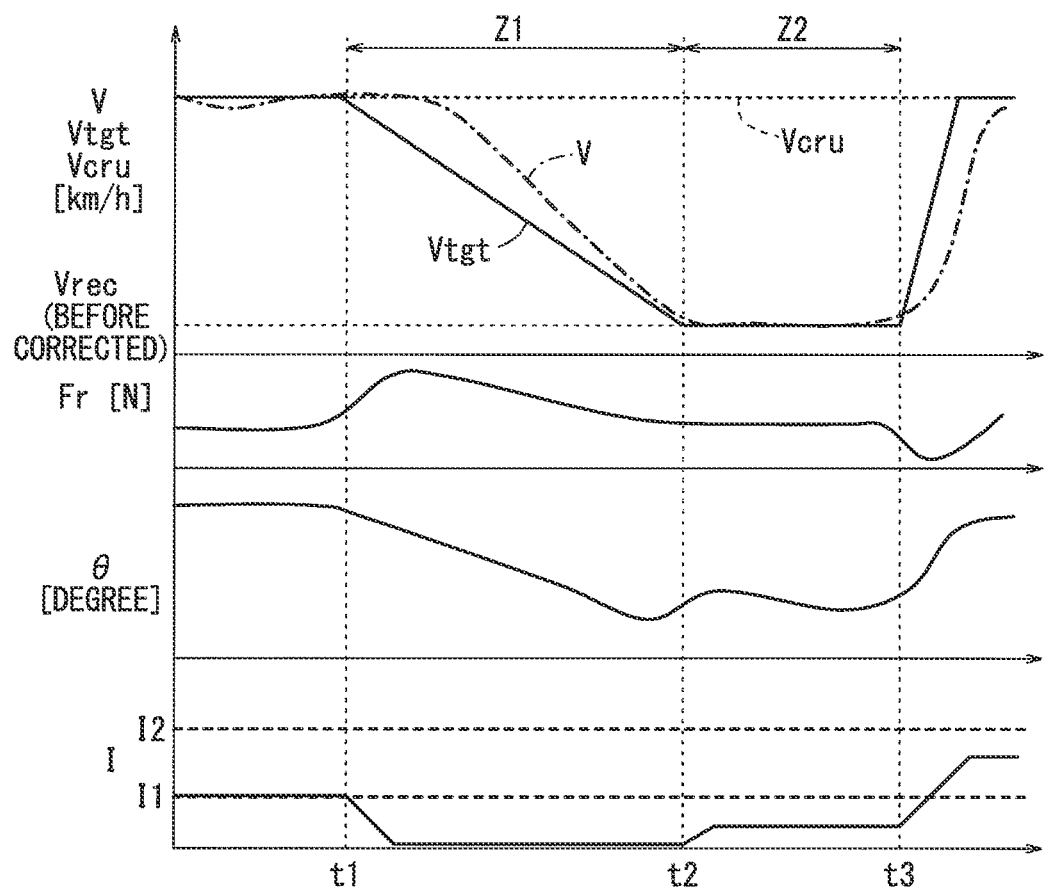
FIG. 13 is a timing chart of a first example of various values occurring in the processing sequence according to the second embodiment shown in FIGS. 9, 10, and 12.

FIG. 13 shows an example in which the intension value I is smaller than the threshold value I1 in either one of the curve approaching zone Z1 or the circling zone Z2.

In FIG. 13, when the vehicle 10 enters the curve approaching zone Z1 at time t1, the target value Vtgt decreases toward the recommended speed Vrec before the target value Vtgt is corrected, and the reaction force Vr increases accordingly. As a result, the accelerator pedal depressed angle θ is reduced, and so is the speed V.

At time t2, the target value Vtgt decreases to the recommended speed Vrec before the target value Vtgt is corrected. In the circling zone Z2 (from time t2 to time t3), the speed V is kept constant.

Figure 14:
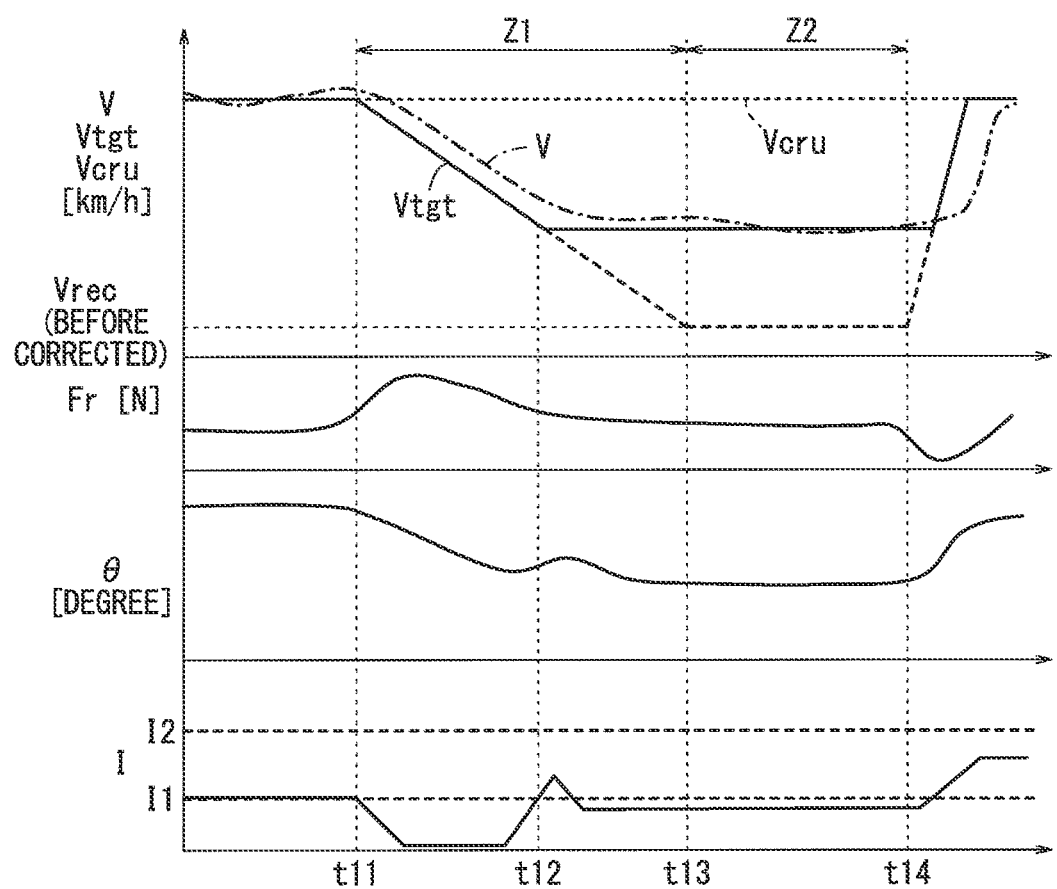
FIG. 14 is a timing chart of a second example of various values occurring in the processing sequence according to the second embodiment shown in FIGS. 9, 10, and 12.

FIG. 14 shows an example in which the intension value I temporarily becomes equal to or greater than the threshold value I1 within the curve approaching zone Z1, and is kept smaller than the threshold value I1 within the circling zone Z2.

In FIG. 14, after the vehicle 10 enters the curve approaching zone Z1 at time t11, the intension value I becomes equal to or greater than the threshold value I1 at time t12. The speed V at time t12 is set (finalized) as the recommended speed Vrec, after which the recommended speed Vrec is maintained as the target speed Vtgt until the vehicle 10 leaves the curve approaching zone Z1. In the circling zone Z2 (from time t13 to time t14), the intention value I is kept smaller than the threshold value I1, and hence the recommended speed Vrec is maintained as it was set in the curve approaching zone Z1. As described above, within the circling zone Z2, the recommended speed Vrec is used as the target speed Vtgt. Therefore, the speed V1 also is maintained constant within the circling zone Z2 (from time t13 to time t14). In FIG. 14, the target speed Vtgt before the recommended speed Vrec is corrected, i.e., the target speed Vtgt shown in FIG. 13, is shown by the dotted line. The target speed Vtgt also is shown by the dotted line in FIGS. 15 and 16.

Figure 15:
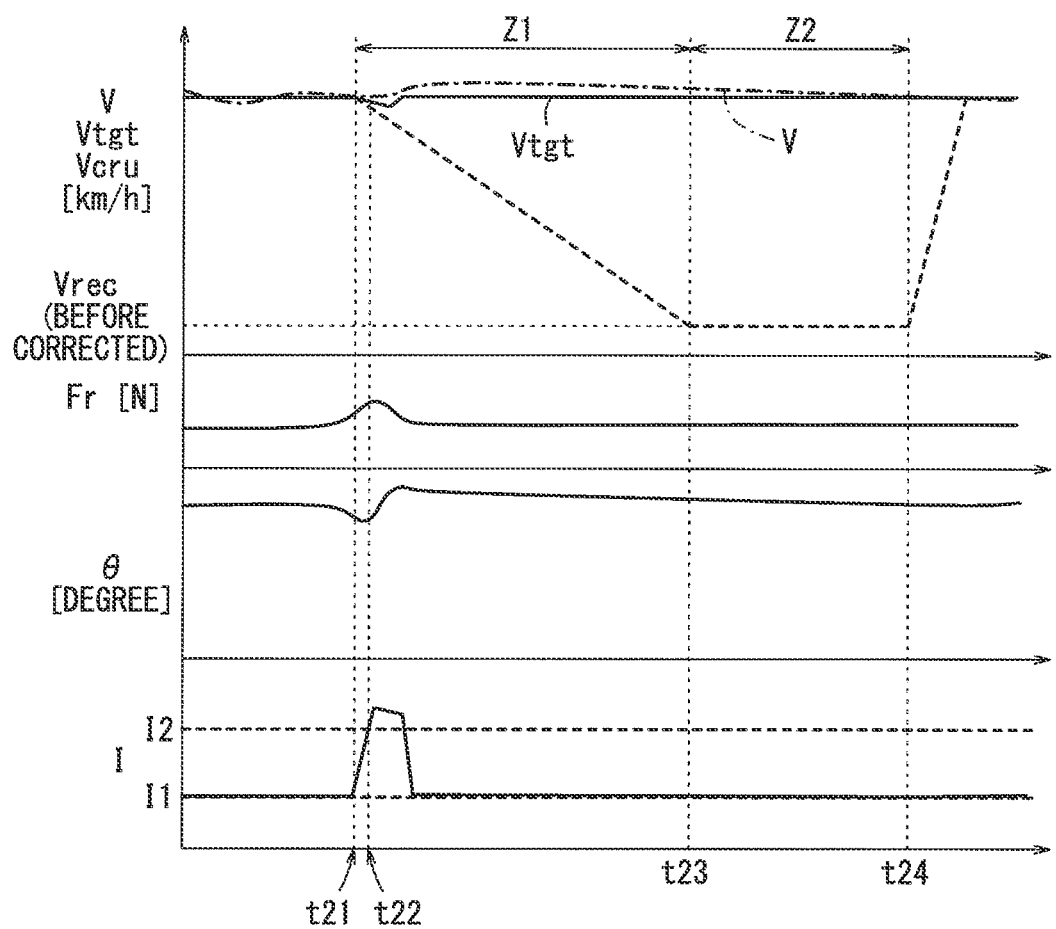
FIG. 15 is a timing chart of a third example of various values occurring in the processing sequence according to the second embodiment shown in FIGS. 9, 10, and 12.

FIG. 15 shows an example in which the intension value I temporarily becomes equal to or greater than the threshold value I2 in the curve approaching zone Z1, and is subsequently kept equal to the threshold value I1.

In FIG. 15, when the vehicle 10 enters the curve approaching zone Z1 at time t21, the intension value I rises from the threshold value I1. Therefore, the target speed Vtgt remains essentially unchanged. At time t22, the intension value I becomes equal to or greater than the threshold value I2. The recommended speed Vrec is restored to the target cruising speed Vcru before the vehicle 10 enters the curve approaching zone Z1. Thereafter, until the circling zone Z2 (from time t23 to time t24) ends, the recommended speed Vrec is maintained as the target cruising speed Vcru. As a result, the speed V also is kept substantially constant from time t22 to time t24.

Figure 16:
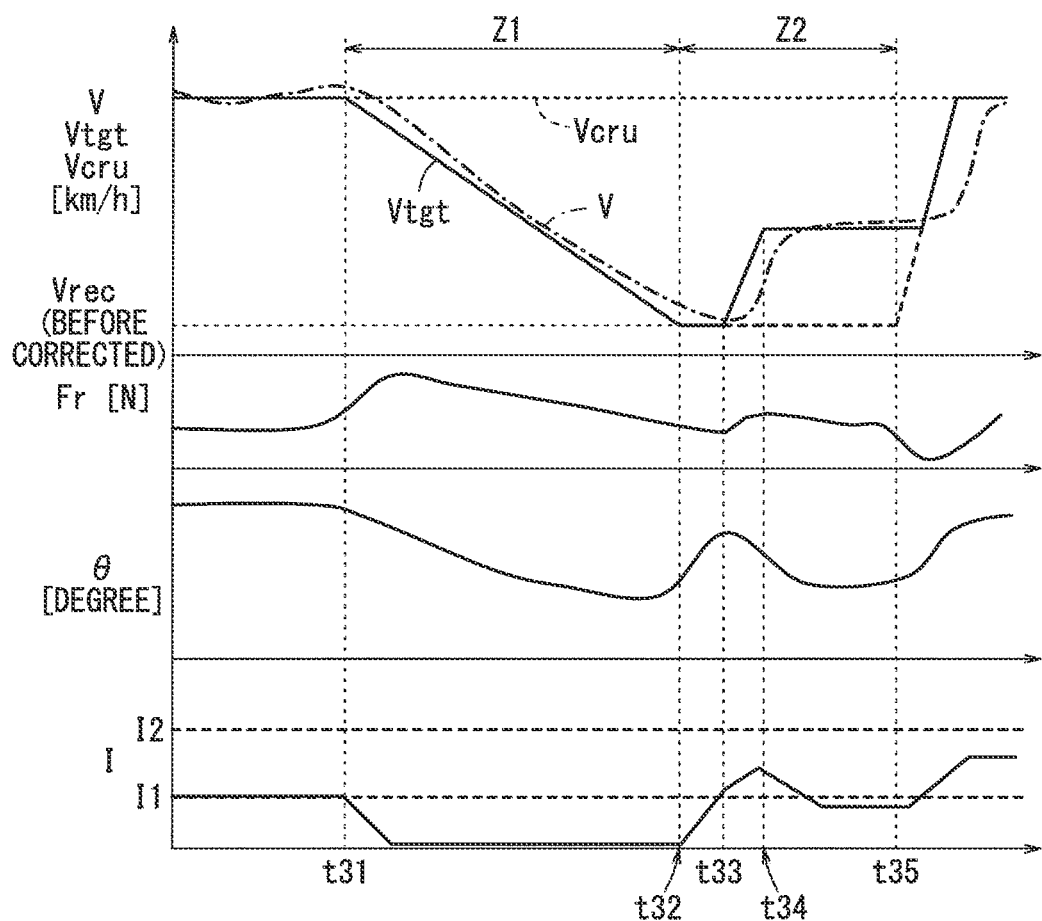
FIG. 16 is a timing chart of a fourth example of various values occurring in the processing sequence according to the second embodiment shown in FIGS. 9, 10, and 12.

FIG. 16 shows an example in which the intension value I is smaller than the threshold value I1 in the curve approaching zone Z1, and temporarily becomes equal to or greater than the threshold value I1, but smaller than the threshold value I2, in the circling zone Z2.

In FIG. 16, the values in the curve approaching zone Z1 (from time t31 to time t32) are the same as those in the example of FIG. 13. At time t32, the vehicle 10 enters the circling zone Z2. Thereafter, at time t33, the intention value I becomes equal to or greater than the threshold value I1, but smaller than the threshold value I2. The recommended speed Vrec and the target speed Ttgt start increasing and continue to increase until time t34. The speed V also increases accordingly. From time t34 to time t35, the change ΔI becomes equal to or smaller than zero, so that the recommended speed Vrec and the target speed Tgt become constant, with the result that the speed V is maintained substantially constant.

Figure 17:
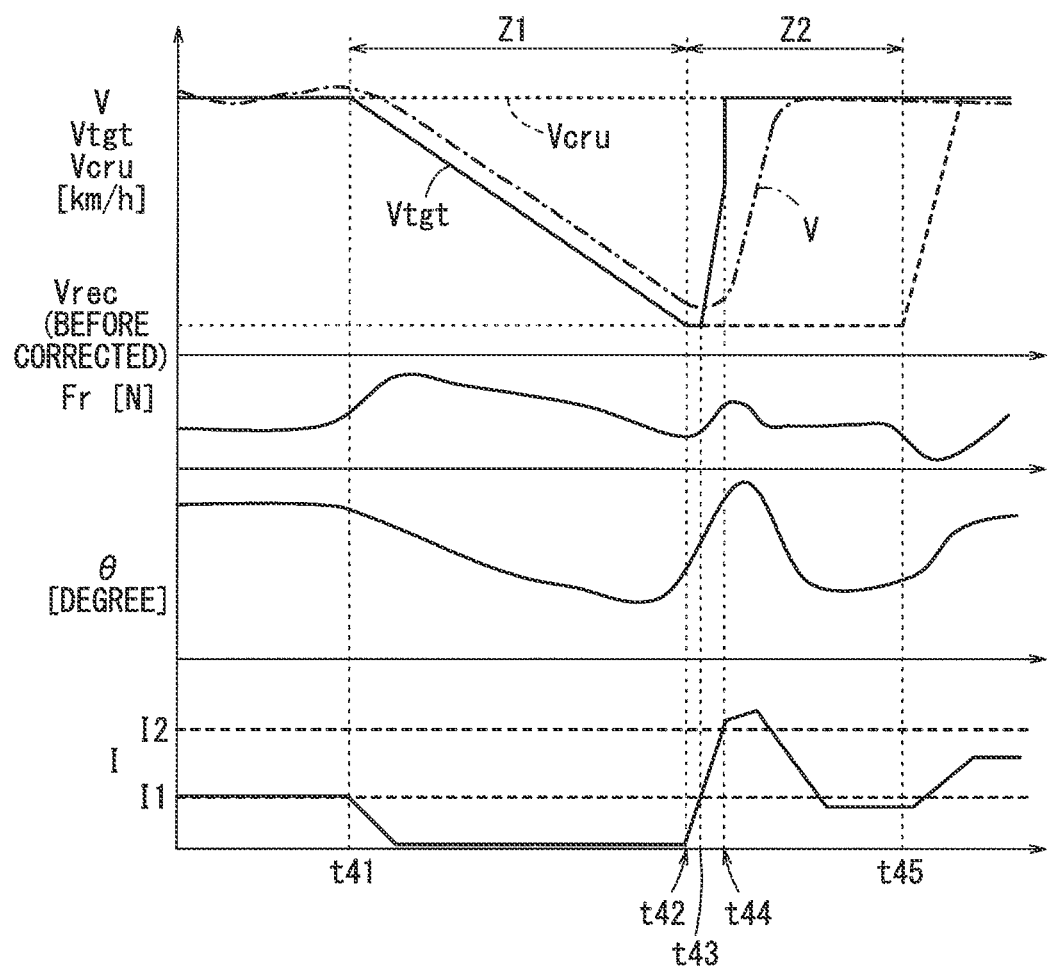
FIG. 17 is a timing chart of a fifth example of various values occurring in the processing sequence according to the second embodiment shown in FIGS. 9, 10, and 12.

FIG. 17 shows an example in which the intension value I is smaller than the threshold value I1 in the curve approaching zone Z1, and temporarily becomes equal to or greater than the threshold value I2 in the circling zone Z2.

In FIG. 17, the values in the curve approaching zone Z1 (from time t41 to time t42) are the same as those in the examples of FIGS. 13 and 16. At time t42, the vehicle 10 enters the circling zone Z2. Thereafter, at time t43, the intention value I becomes equal to or greater than the threshold value I1, but smaller than the threshold value I2. At this time, the recommended speed Vrec begins to increase. At time t44, the intention value I becomes equal to or greater than the threshold value I2. The recommended value Vrec and the target speed Vtgt are restored to the target cruising speed Vcru before the vehicle 10 enters the curve approaching zone Z1. Thereafter, while the vehicle 10 is traveling in the circling zone Z2, the recommended value Vrec and the target speed Vtgt become constant, with the result that the speed V is maintained substantially constant.

Figure 18:
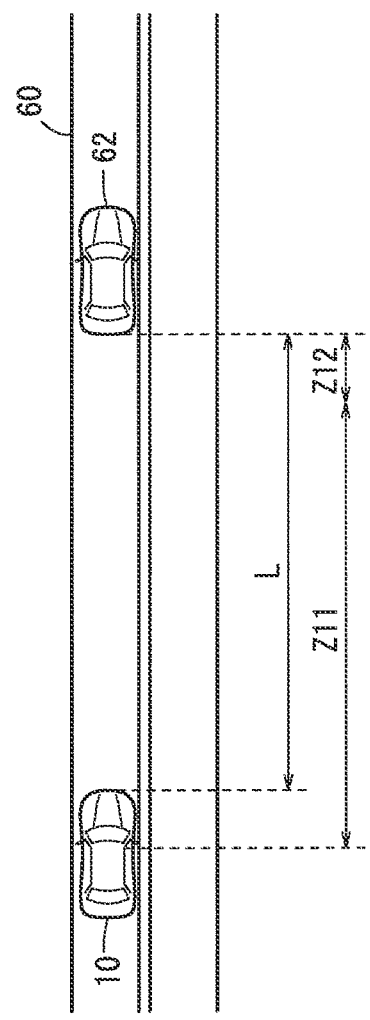
FIG. 18 is a view showing a positional relationship between the vehicle (host vehicle) and a leading vehicle on a straight road.

(2) When the Vehicle 10 Travels Along a Straight Road:

FIG. 18 is a view showing a positional relationship between the vehicle 10 and a leading vehicle 62 on a straight road 60.

First, a relative distance L and zones Z11, Z12 shown in FIG. 18 will be described below. The relative distance L, which represents the distance between the vehicle 10 (host vehicle) and the leading vehicle 62 (obstacle), is determined based on an output signal from the radar device 28. Zone Z11 is a zone (hereinafter referred to as a "low-speed maintaining zone Z11") in which a recommended speed Vrec (in this case, a recommended obstacle-approaching speed Vrec_app), which is a low speed, is maintained as the target speed Vtgt in order to avoid contact with the leading vehicle 62. Zone Z11 also is a zone (which corresponds to the "intention determining zone Z3" in FIG. 8) for judging whether or not the driver intends to change the recommended speed Vrec. The low-speed maintaining zone Z11 need not necessarily be in agreement with the intention determining zone, and the intention determining zone may be provided separately. Prior to zone Z11, a zone (which corresponds to the "curve approaching zone Z1" in FIG. 8) may be provided for controlling the reaction force Fr in order to lower the speed V down to the recommended speed Vrec before the speed V is corrected.

Zone Z12 is a zone (hereinafter referred to as a "decelerating zone Z12") in which the ECU 22 operates the automatic braking mechanism 18 to decelerate the vehicle 10 automatically, so as to avoid contact with the leading vehicle 62. In the low-speed maintaining zone Z11, the automatic braking mechanism 18 may be operated to decelerate the vehicle 10 gradually. According to such an alternative, the vehicle 10 is decelerated more quickly in the decelerating zone Z12.

The low-speed maintaining zone Z11 and the decelerating zone Z12 are set depending on a contact margin time TTC (TTC=L/Vr), which serves as a contact margin value with respect to an obstacle (in this case, the leading vehicle 62) in front of the vehicle 10.

Figure 19:
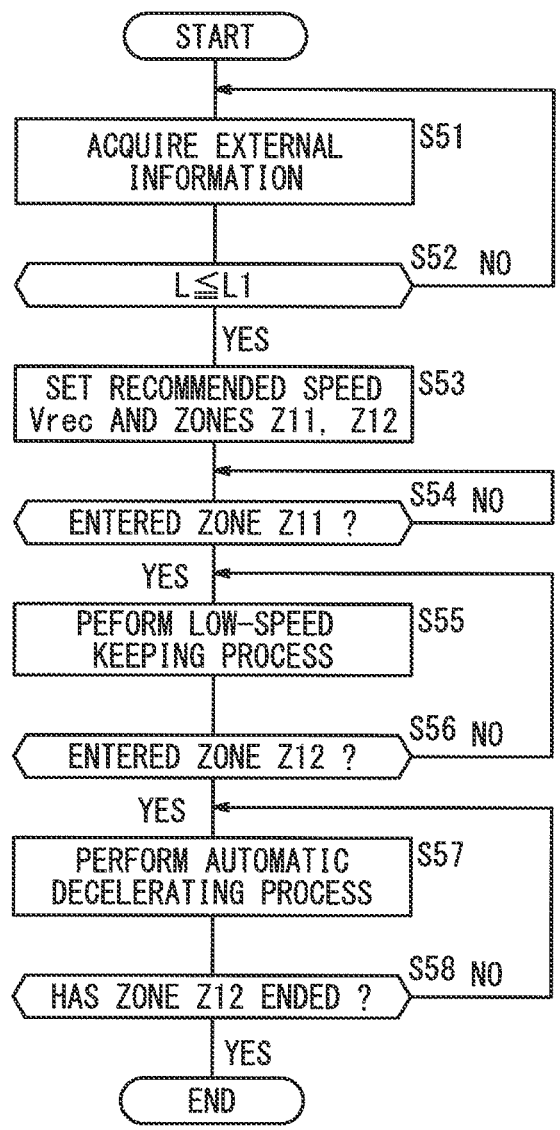
FIG. 19 is a flowchart of a process for controlling the reaction force at a time that the vehicle approaches an obstacle (including a leading car)

FIG. 19 is a flowchart of a process for controlling the reaction force Fr at a time that the vehicle 10 approaches an obstacle (including the leading vehicle 62).

In step S51, the processor 36 of the ECU 22 acquires external situation information from the radar device 28. More specifically, the processor 36 acquires, from the radar device 28, the relative distance L between the vehicle 10 (host vehicle) and the obstacle.

In step S52, the processor 36 judges whether or not the relative distance L between the vehicle 10 and the leading vehicle 62 (obstacle) is equal to or smaller than a predetermined value L1. The predetermined value L1 serves to determine whether or not the low-speed maintaining zone Z11 and the decelerating zone Z12 should be set. It is possible to determine that the relative distance L is equal to or smaller than the predetermined value L1 by means of the radar device 28 that detects the leading vehicle 62 (obstacle).

If the relative distance L is not equal to or smaller than the predetermined value L1 (S52: NO), then control returns to step S51. If the relative distance L is equal to or smaller than the predetermined value L1 (S52: YES), then control proceeds to step S53.

In step S53, the processor 36 sets a recommended speed Vrec as well as zones Z11 and Z12. More specifically, depending on the contact margin time TTC, the processor 36 sets a recommended speed Vrec, a low-speed maintaining zone Z11, and a decelerating zone Z12.

In step S54, based on the relative distance L detected by the radar device 28, the processor 36 judges whether or not the vehicle 10 (host vehicle) has entered the low-speed maintaining zone Z11. If the vehicle 10 has not entered the low-speed maintaining zone Z11 (S54: NO), step S54 is repeated. If the vehicle 10 or the leading vehicle 62 changes lanes, such that the leading vehicle 62 is no longer in front of the vehicle 10, the present processing sequence may be terminated.

If the vehicle 10 has entered the low-speed maintaining zone Z11 (S54: YES), then the processor 36 performs a low-speed maintaining process in step S55. Details of the low-speed maintaining process are the same as those of the process that is carried out when the vehicle 10 makes a turn, as shown in FIG. 9 (also refer to the flowchart of FIG. 12). At the time that the vehicle 10 enters the low-speed maintaining zone Z11, the reaction force Fr starts being applied to the accelerator pedal 12 with the recommended speed Vrec being set as the target speed Vtgt. Thereafter, the recommended speed Vrec can be corrected based on the driver intention value I.

In step S56, the processor 36 judges whether or not the vehicle 10 has entered the decelerating zone Z12 based on the relative distance L detected by the radar device 28. If the vehicle 10 has not entered the decelerating zone Z12 (S56: NO), then step S55 is repeated. Therefore, as long as the answer to step S56 is NO, the low-speed maintaining process in step S55 is repeated while the vehicle 10 remains within the low-speed maintaining zone Z11.

If the vehicle 10 has entered the decelerating zone Z12 (S56: YES), the processor 36 performs an automatic decelerating process in step S57. More specifically, the processor 36 operates the automatic braking mechanism 18 in order to automatically decelerate the vehicle 10. At this time, in order for the vehicle 10 to avoid hitting the leading vehicle 62, the processor 36 may also carry out a control process for assisting the driver in turning a steering wheel (not shown).

In step S58, the processor 36 judges whether or not the decelerating zone Z12 has ended based on the relative distance L detected by the radar device 28. If the decelerating zone Z12 has not ended, i.e., if the vehicle 10 is still traveling in the decelerating zone Z12, (S58: NO), then step S57 is repeated. Therefore, as long as the answer to step S58 is NO, the automatic decelerating process in step S57 is repeated while the vehicle 10 remains within the decelerating zone Z12.

If the decelerating zone Z12 is completed (S58: YES), then the present processing sequence is brought to an end.

3. Advantages of the Second Embodiment

According to the second embodiment, as described above, when the vehicle 10 is assisted in traveling by controlling the reaction force Fr based on the recommended speed Vrec depending on the external situation around the vehicle 10 (host vehicle), the recommended speed Vrec is corrected based on the intention of the driver to adjust the vehicle speed. Therefore, even if the external situation information acquired by the vehicle 10 is erroneous, or if the recommended speed Vrec depending on the external situation deviates from the speed intended by the driver, it is possible to change the recommended speed Vrec in order to better reflect the intention of the driver. Consequently, the driver is prevented from feeling a sense of discomfort due to the recommended speed Vrec being set at an inappropriate value.

Since the circling zone Z2 (the recommended speed maintaining zone) is provided for maintaining the recommended speed Vrec depending on the external situation, it is possible for the vehicle 10 to set the time until a control process for maintaining the recommended speed Vrec is performed. Therefore, the control process for maintaining the recommended speed Vrec can be performed only within an appropriate zone. After the vehicle 10 has left the circling zone Z2, a new recommended speed Vrec may be used, or the control process for maintaining the recommended speed Vrec may be canceled, so that a control process based on a new external situation can be performed by the driver or be prompted by the vehicle 10. From this point of view as well, it also is possible to prevent the driver from feeling ill at ease.

In the second embodiment, the ECU 22 controls the reaction force Fr in the curve approaching zone Z1 in order to equalize the speed V of the vehicle 10 to the recommended speed Vrec at the time that the vehicle 10 enters the circling zone Z2. The ECU 22 also controls the reaction force Fr in the circling zone Z2 and the low-speed maintaining zone Z11 in order to equalize the speed V of the vehicle 10 to the recommended speed Vrec (with the recommended speed Vrec being used as the target speed Vtgt). The ECU 22 also determines the intention of the driver based on the above equation (a), including the change θdif per unit time in the accelerator pedal depressed angle θ in zones Z1, Z2, and Z3.

Thus, in zones Z1, Z2, and Z3, it is possible to acquire the speed adjusting intention of the driver while the reaction force Fr is being applied to the accelerator pedal 12, in order to drive the vehicle 10 automatically at the recommended speed Vrec. By correcting the recommended speed Vrec based on the speed adjusting intention of the driver, the driver is less likely to feel a sense of discomfort as a result of the reaction force Fr.

In the second embodiment, the ECU 22 outputs the intention value I of the driver for determining the speed adjusting intention of the driver depending on the change θdif per unit time in the accelerator pedal depressed angle θ in the intention determining zone Z3, and the difference between the accelerator pedal depressed angle θcrr in zone Z3 and the accelerator pedal depressed angle θinit at the time that the vehicle 10 enters zone Z3. The ECU 22 corrects the recommended speed Vrec in order to increase the recommended speed Vrec as the intention value I increases.

Since the intention of the driver to adjust the vehicle speed is determined depending on the accelerator pedal change θdif and the difference between the accelerator pedal depressed angle θinit at the time that the vehicle 10 enters zone Z3 and the accelerator pedal depressed angle θcrr occurring within zone Z3, the speed adjusting intention of the driver can be determined highly accurately. More specifically, even if the driver depresses the accelerator pedal 12 gradually, the recommended speed Vrec increases accordingly as the driver intention value I increases.

In the second embodiment, if the planned route of the vehicle 10 includes a curved road 50, then the ECU 22 judges whether or not the curvature C of the curved road 50 is equal to or greater than a predetermined curvature C1. If the ECU 22 determines that the curvature C of the curved road 50 is equal to or greater than the predetermined curvature C1, the ECU 22 sets a recommended speed Vrec depending on the curvature C. The ECU 22 sets a portion of the curve approaching zone Z1 and the circling zone Z2 as the intention determining zone Z3, controls the reaction force Fr in order to operate the vehicle 10 at the recommended circling speed Vrec_cir within the curve approaching zone Z1, and determines the intention of the driver to adjust the vehicle speed from the outlet of the curve approaching zone Z1.

With the above arrangement, even on a curved road 50, the drive assistance (the output of the reaction force Fr) given by the vehicle 10 (host vehicle) can be controlled while reflecting the intention of the driver to adjust the vehicle speed. Accordingly, the driver is assisted in driving the vehicle 10 on the curved road 50 without feeling uncomfortable.

If the information Ir acquired from the navigation system 20 is in error and a curved road 50 is not actually present, or if the information Ir acquired from the navigation system 20 is of poor accuracy, the information Ir can be corrected based on the driver's intention to adjust the vehicle speed.

In the second embodiment, when the radar device 28 detects a leading vehicle 62 in front of the vehicle 10, the ECU 22 sets a recommended speed Vrec depending on the relative distance L between the vehicle 10 and the leading vehicle 62, and then controls the reaction force Fr in order to achieve the recommended speed Vrec before the relative distance L becomes equal to or smaller than the predetermined value L1. Further, the ECU 22 determines the intention of the driver to adjust the vehicle speed from a point in time at which the leading vehicle 62 is detected.

With the above arrangement, when the vehicle 10 detects a leading vehicle 62 while traveling on a straight road, the vehicle 10 sets a recommended speed Vrec, and generates a reaction force Vr in order to achieve the recommended speed Vrec, thereby making it possible to avoid a collision with the leading vehicle 62. In addition, if the driver recognizes the leading vehicle 62 and reduces the relative distance L in an effort to overtake the leading vehicle 62, the intention of the driver is given priority, and hence the driver is prevented from feeling a sense of discomfort while driving the vehicle 10.

The present invention is not limited to the above embodiments, but may adopt various alternative arrangements based on the disclosure of the above description. For example, the present invention may adopt the following alternative arrangements.

[Modifications]

1. Applications:

In the second embodiment, processes have been described for the vehicle 10 that travels along a curved road 50 so as to avoid contact with a leading vehicle 62. However, the present invention also is applicable to other situations in which a zone (recommended speed maintaining zone) is set for maintaining a recommended speed Vrec, which is set based on external situation information (information concerning the environment around the vehicle 10), and in particular, the invention is suitable for a situation in which the recommended speed Vrec is lower than the target cruising speed Vcru. For example, the present invention is applicable to a control process for providing a zone in which a recommended speed Vrec is maintained before an intersection, in a case where the vehicle 10 needs to stop temporarily, based on the information Ir from the navigation system 20.

2. External Situation Information (Vehicle Information):

In the second embodiment, information Ir from the navigation system 20 as well as the relative distance L and the relative speed Vr from the radar device 28 are provided as external situation information, which are used by the ECU 22. However, instead of information Ir from the navigation system 20, positional information of the vehicle 10 and information concerning the curved road 50 (i.e., the distance to the curved road 50, the curvature of the curved road 50, etc.) may be acquired from optical beacons, which are installed along the side of a road on which the vehicle 10 travels.

In the second embodiment, the information Ir from the navigation system 20 includes information concerning the curvature C of the curved road 50, and the ECU 22 judges whether or not the curvature C is equal to or greater than a predetermined value C1. However, decision information concerning whether or not the curvature C is equal to or greater than the predetermined value C1 may be included in the information Ir from the navigation system 20, and the ECU 22 may set the recommended speed Vrec using such decision information.

In the second embodiment, a recommended speed Vrec is set depending on external situation information. However, the recommended speed Vrec may be set depending on other information concerning the traveling state of the vehicle (traveling state information). The traveling state information may include, for example, information concerning whether or not the vehicle 10 is in an automatic cruising mode (automatic cruising information). When the automatic cruising switch 29, which is incorporated in a steering wheel or the like (not shown), is pressed in order to place the vehicle 10 in an automatic constant-speed traveling state, the ECU 22, which functions as an information acquirer for acquiring vehicle information, acquires the automatic cruising information.

Figure 20:
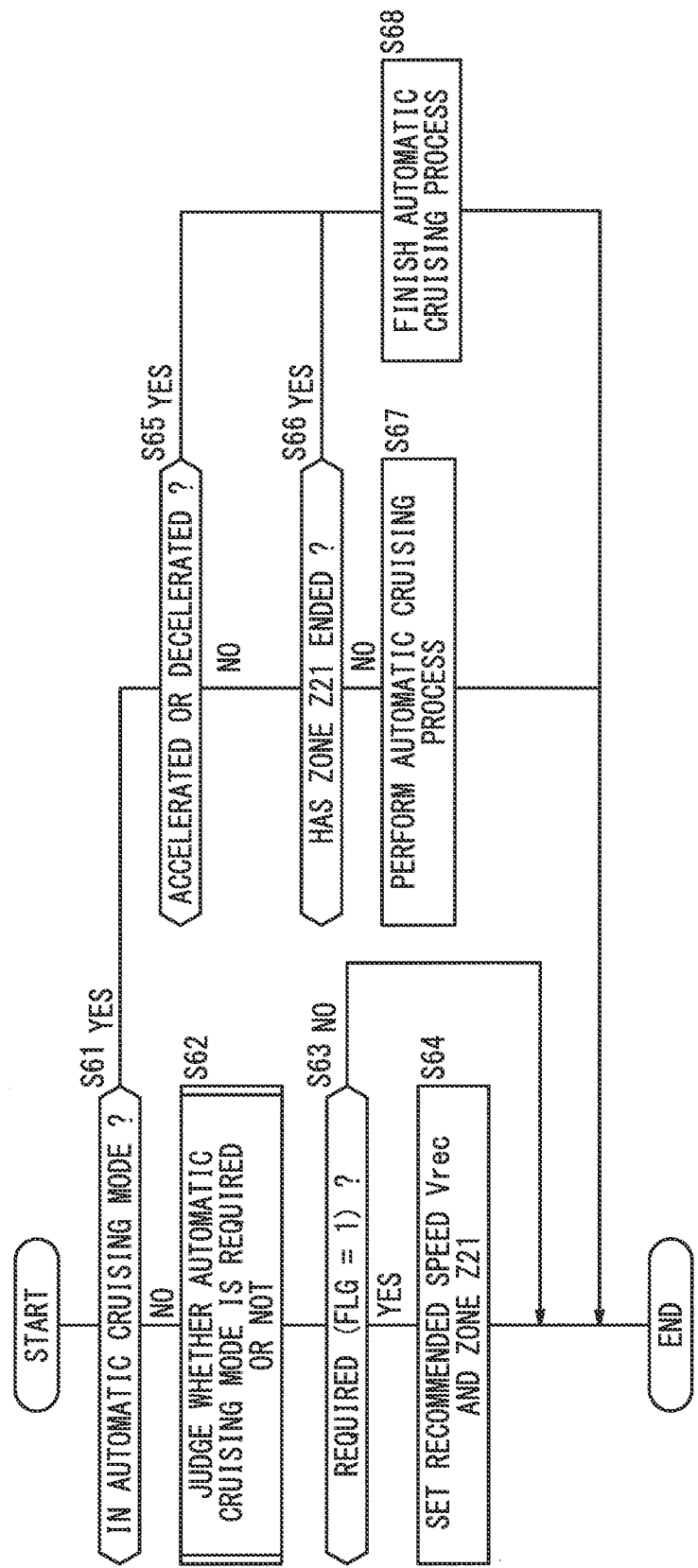
FIG. 20 is a flowchart of a process for controlling the reaction force based on automatic cruising information.

FIG. 20 is a flowchart of a process during which the ECU 22 controls the reaction force based on automatic cruising information. In step S61, the processor 36 of the ECU 22 judges whether or not the automatic cruising switch 29 has been pressed in order to bring the vehicle 10 into an automatic cruising mode, in which the vehicle 10 assumes an automatic constant-speed traveling state. If the vehicle 10 is not in the automatic cruising mode (S61: NO), then in step S62, the processor 36 judges whether or not the automatic cruising mode is required.

Figure 21:
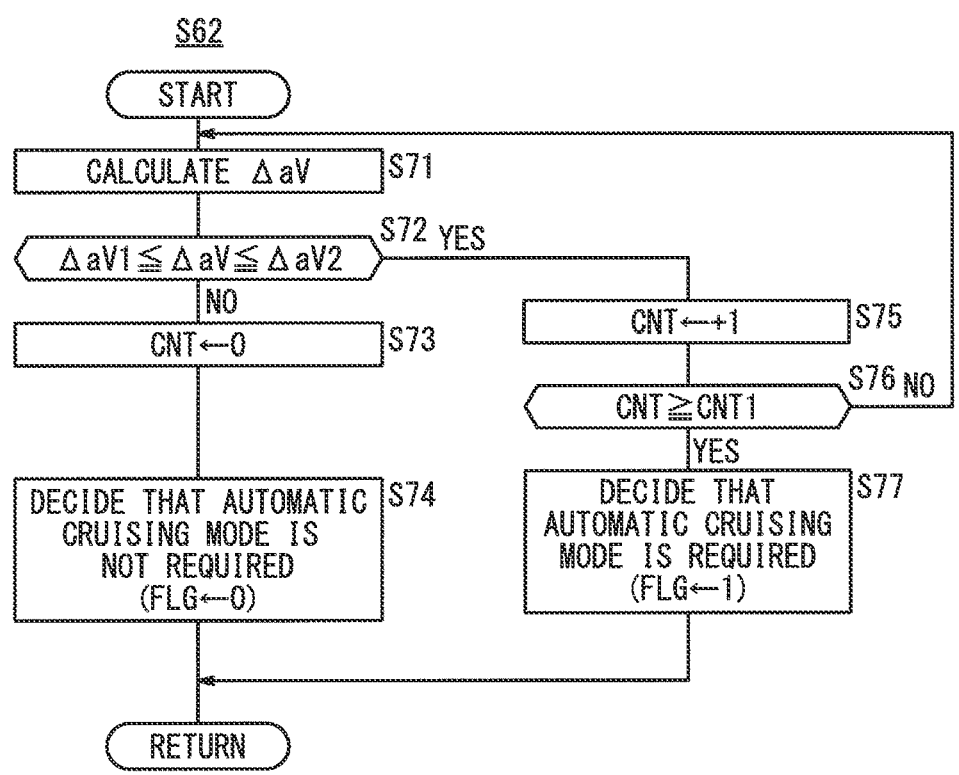
FIG. 21 is a flowchart of a process carried out by an electronic control unit for judging whether or not an automatic cruising mode is required.

FIG. 21 is a flowchart of a process, which is carried out by the ECU 22, for judging whether or not the automatic cruising mode is required. In step S71, the processor 36 calculates an acceleration ΔaV [km/h/sec] of the vehicle 10 based on the speed V from the vehicle speed sensor 16.

In step S72, the processor 36 judges whether or not the acceleration ΔaV calculated in step S71 is equal to or greater than a first threshold value ΔaV1 and equal to or smaller than a second threshold value ΔaV2. The first threshold value ΔaV1 and the second threshold value ΔaV2 are threshold values used to judge whether or not the speed V of the vehicle 10 is substantially constant. The first threshold value ΔaV1 is a negative value, whereas the second threshold value ΔaV2 is a positive value.

If the acceleration ΔaV is not equal to or greater than the first threshold value ΔaV1, and is not equal to or smaller than the second threshold value ΔaV2 (S72: NO), then in step S73, the processor 36 resets a counter CNT, by which it is judged whether or not the automatic cruising mode is required. In step S74, the processor 36 sets a flag FLG for judging whether or not the automatic cruising mode is required to "0", which indicates that the automatic cruising mode is not required.

If the acceleration ΔaV is equal to or greater than the first threshold value ΔaV1, and equal to or smaller than the second threshold value ΔaV2 (S72: YES), then in step S75, the processor 36 increments the counter CNT by 1. In step S76, the processor 36 judges whether or not the counter CNT is equal to or greater than a counter threshold value CNT1, by which it is judged whether or not the automatic cruising mode is required. If the counter CNT is not equal to or greater than the counter threshold value CNT1 (S76: NO), then the control returns to step S71.

If the counter CNT is equal to or greater than the counter threshold value CNT1 (S76: YES), then in step S77, the processor 36 sets the flag FLG to "1", which indicates that the automatic cruising mode is required.

In steps S71 and S72, a depressing speed of the accelerator pedal 12 may be used instead of the acceleration LaV in order to detect when the speed V has stabilized. Alternatively, the speed V may be determined as being stabilized by judging whether or not the speed V is between an upper limit value and a lower limit value.

In step S63 of FIG. 20, the processor 36 judges whether or not the automatic cruising mode is required, i.e., whether or not the flag FLG is 1. If the flag FLG is 0 and the automatic cruising mode is not required (S63: NO), then the present processing sequence is brought to an end. If the FLG is 1 and the automatic cruising mode is required (S63: YES), then in step S64, the processor 36 sets the current speed V at that time as the recommended speed Vrec, and sets a zone Z21. The zone Z21 is a zone in which the recommended speed Vrec is maintained, and is set based on information Ir from the navigation system 20, for example. For example, based on the information concerning a limit speed contained in the information Ir, a zone up to the time when the limit speed is changed next is set as the zone Z21. Alternatively, based on the information Ir, a zone up to a certain point prior to an intersection where it is expected that the vehicle 10 will turn next, i.e., a point that is spaced a predetermined distance from the intersection, may be set as the zone Z21. Further, alternatively, while the vehicle 10 is traveling on an expressway, based on the information Ir, a zone up to a certain point prior to an interchange at which the vehicle 10 will exit from the expressway, i.e., a point that is spaced a predetermined distance from the interchange, may be set as the zone Z21.

If the vehicle 10 is in an automatic cruising mode (S61: YES), then the processor 36 judges whether the vehicle 10 is accelerating or decelerating. The processor 36 may judge that the vehicle 10 is accelerating or decelerating using the acceleration ΔaV, for example. If the vehicle 10 is not accelerating or decelerating (S65: NO), then in step S66, the processor 36 judges whether or not the zone Z21 has ended. If the zone Z21 has not ended (S66: NO), then in step S67, the processor 36 performs an automatic cruising process. The specific details of the automatic cruising process are the same as those of the process that is carried out when the vehicle 10 makes a turn, as shown in FIG. 9 (the flowchart shown in FIG. 12), or are the same as those of the low-speed keeping process, as shown in FIG. 19. Therefore, at the time that the vehicle 10 enters the zone Z21, the reaction force Fr starts to be applied to the accelerator pedal 12 with the recommended speed Vrec set as the target speed Vtgt. Thereafter, the recommended speed Vrec can be corrected based on the driver intention value I.

If the vehicle 10 is accelerating or decelerating in step S65 (S65: YES), or if the zone Z21 has ended in step S66 (S66: YES), then in step S68, the processor 36 terminates the automatic cruising process.

The process shown in FIGS. 21 and 22 offers the same advantages as the above-described second embodiment.

3. Judgment of the Speed Adjusting Intention:

In the second embodiment, the intention of the driver to adjust the speed is judged using the intention value I, which is calculated according to the above equation (a). However, the intention of the driver to adjust the speed may be judged using only the first term (K1×θdif) of the right side of equation (a), but not the second term K2×(θcrr−θinit) thereof.

4. Zone for Determining the Driver's Intention:

In the second embodiment, the intention determining zone Z3 (the curve approaching zone Z1 and part of the circling zone Z2) and the low-speed maintaining zone Z11 are used as a zone for determining the speed adjusting intention of the driver. However the starting and ending positions of these zones may be changed as desired. For example, the curve approaching zone Z1 and the circling zone Z2 may be used entirely as an intention determining zone. The intention determining zone Z3 may also be set from a point prior to entering the curve approaching zone Z1.

The invention claimed is:

1. A vehicle travel control apparatus comprising:
   a reaction force controller for controlling a reaction force to be applied to an accelerator pedal;
   a depressed angle sensor for detecting an accelerator pedal depressed angle of the accelerator pedal;
   an intention determiner for determining a vehicle speed adjusting intention of a driver based on the accelerator pedal depressed angle detected by the depressed angle sensor;
   a recommended speed estimator for estimating a recommended speed for a host vehicle based on an external situation around the host vehicle, or based on a traveling state of the host vehicle; and
   a vehicle speed sensor for detecting a present vehicle speed of the host vehicle;
   wherein the reaction force controller judges whether or not it is necessary to seek the driver's attention based on the recommended speed estimated by the recommended speed estimator, the present vehicle speed detected by the vehicle speed sensor, and a present accelerator pedal depressed angle detected by the depressed angle sensor, and if the reaction force controller determines that it is necessary to seek the driver's attention, the reaction force controller applies an attention seeking reaction force to the accelerator pedal for a predetermined time to decelerate a vehicle based on a judgment made by the vehicle itself, and after the attention seeking reaction force is sharply reduced, the intention determiner sets an intention determining period required to determine the vehicle speed adjusting intention of the driver, and the reaction force controller applies an intention determining reaction force smaller than the attention seeking reaction force for the intention determining period, and
   the intention determiner determines the vehicle speed adjusting intention of the driver depending on the accelerator pedal depressed angle, which is detected by the depressed angle sensor during the intention determining period.

2. The vehicle travel control apparatus according to claim 1, further comprising:
   a target depressed angle setter for setting a target accelerator pedal depressed angle, which is the accelerator pedal depressed angle required to keep a target cruising speed, which is a vehicle speed when the driver holds the accelerator pedal depressed angle within a predetermined range; and
   an attention seeking depressed angle setter for setting an attention seeking accelerator pedal depressed angle, which is the accelerator pedal depressed angle that is set to a value smaller than the target accelerator pedal depressed angle, as a threshold value for judging whether or not the driver's attention is to be sought;
   wherein if an actual accelerator pedal depressed angle detected by the depressed angle sensor is greater than the target accelerator pedal depressed angle set by the target depressed angle setter, the reaction force controller applies a cruising reaction force, which is smaller than the intention determining reaction force, to the accelerator pedal for maintaining the target cruising speed, and if the present vehicle speed detected by the vehicle speed sensor is greater than the recommended speed estimated by the recommended speed estimator by at least a predetermined value, and the present accelerator pedal depressed angle is greater than the attention seeking accelerator pedal depressed angle, the reaction force controller applies the attention seeking reaction force, which is greater than the intention determining reaction force, and thereafter applies the intention determining reaction force.

3. The vehicle travel control apparatus according to claim 2, wherein if a maximum value of the actual accelerator pedal depressed angle in the intention determining period is smaller than the attention seeking accelerator pedal depressed angle set by the attention seeking depressed angle setter, the intention determiner determines that the driver intends to decelerate the host vehicle.

4. The vehicle travel control apparatus according to claim 3, further comprising:
   an automatic brake controller;
   wherein if the intention determiner determines that the driver intends to decelerate the host vehicle, the automatic brake controller automatically brakes the host vehicle in order to assist the driver in decelerating the host vehicle.

5. A vehicle travel control apparatus comprising:
   an information acquirer for acquiring vehicle information, which is information concerning an external situation or a traveling state of a host vehicle while the host vehicle is traveling;
   a recommended speed setter for setting a recommended speed for the host vehicle depending on the vehicle information acquired by the information acquirer;
   a recommended speed maintaining zone setter for setting a recommended speed maintaining zone as a zone for maintaining the recommended speed depending on the vehicle information acquired by the information acquirer;

a reaction force controller for controlling a reaction force to be applied to an accelerator pedal;

a depressed angle sensor for detecting an accelerator pedal depressed angle of the accelerator pedal; and an intention determiner for determining a vehicle speed adjusting intention of a driver based on the accelerator pedal depressed angle detected by the depressed angle sensor;

wherein when the host vehicle enters the recommended speed maintaining zone, the reaction force controller controls the reaction force based on the recommended speed set by the recommended speed setter;

the recommended speed setter corrects the recommended speed depending on a determined result from the intention determiner;

the intention determiner outputs an intention value based on the accelerator pedal depressed angle;

the recommended speed setter sets, as the recommended speed, a vehicle speed at a time when the intention value becomes equal to or greater than a first threshold value; and the recommended speed setter sets, as the recommended speed, a vehicle speed immediately before entering the recommended speed maintaining zone, in a case where the intention value becomes equal to or greater than a second threshold value, which is greater than the first threshold value.

6. The vehicle travel control apparatus according to claim 5, wherein the intention determiner determines the vehicle speed adjusting intention of the driver based on at least a change per unit time in the accelerator pedal depressed angle in the recommended speed maintaining zone.

7. The vehicle travel control apparatus according to claim 6, wherein the intention determiner outputs a driver intention value for judging the speed adjusting intention depending on:

the change per unit time in the accelerator pedal depressed angle in the recommended speed maintaining zone; and the difference between the accelerator pedal depressed angle in the recommended speed maintaining zone and the accelerator pedal depressed angle at a time that the host vehicle enters the recommended speed maintaining zone; and the recommended speed setter corrects the recommended speed in order to increase the recommended speed as the driver intention value increases.

8. The vehicle travel control apparatus according to claim 5, further comprising:

an information acquirer for acquiring vehicle information, which is information concerning the external situation, or the traveling state of the host vehicle while the host vehicle is traveling; and a recommended speed setter for setting a recommended speed for the host vehicle depending on the vehicle information acquired by the information acquirer;

wherein the information acquirer detects a leading vehicle or an obstacle in front of the host vehicle while the host vehicle is traveling straight;

if the information acquirer detects the leading vehicle or the obstacle in front of the host vehicle, the recommended speed setter sets the recommended speed depending on the distance between the leading vehicle or the obstacle and the host vehicle;

the reaction force controller controls the reaction force in order to achieve the recommended speed before the distance becomes equal to or smaller than a predetermined value; and the intention determiner determines the speed adjusting intention from the time at which the leading vehicle or the obstacle is detected.

9. A vehicle travel control apparatus comprising:

an information acquirer for acquiring vehicle information, which is information concerning an external situation or a traveling state of a host vehicle while the host vehicle is traveling;

a recommended speed setter for setting a recommended speed for the host vehicle depending on the vehicle information acquired by the information acquirer;

a recommended speed maintaining zone setter for setting a recommended speed maintaining zone as a zone for maintaining the recommended speed depending on the vehicle information acquired by the information acquirer;

a reaction force controller for controlling a reaction force to be applied to an accelerator pedal;

a depressed angle sensor for detecting an accelerator pedal depressed angle of the accelerator pedal; and an intention determiner for determining a vehicle speed adjusting intention of a driver based on the accelerator pedal depressed angle detected by the depressed angle sensor;

wherein when the host vehicle enters the recommended speed maintaining zone, the reaction force controller controls the reaction force based on the recommended speed set by the recommended speed setter;

the recommended speed setter corrects the recommended speed depending on a determined result from the intention determiner;

the intention determiner outputs an intention value based on the accelerator pedal depressed angle;

the recommended speed setter corrects the recommended speed based on a change in the intention value in a case where the intention value value becomes equal to or greater than a first threshold value; and the recommended speed setter sets, as the recommended speed, a vehicle speed immediately before entering the recommended speed maintaining zone, in a case where the intention value becomes equal to or greater than a second threshold value, which is greater than the first threshold value.

\* \* \* \* \*